(12) United States Patent
Hwang et al.

(10) Patent No.: US 12,710,631 B2
(45) Date of Patent: Aug. 18, 2026

(54) OPTICAL SYSTEM MOUNTED ON A CONFOCAL ENDOMICROSCOPE

(71) Applicant: VPIX Medical Incorporation, Daejeon (KR)

(72) Inventors: Kyungmin Hwang, Daejeon (KR); Kyuyoung Kim, Daejeon (KR); Yeongryeol Kim, Daejeon (KR)

(73) Assignee: VPIX Medical Incorporation, Daejeon (KR)

( * ) Notice: Subject to any disclaimer, the term of this patent is extended or adjusted under 35 U.S.C. 154(b) by 0 days.

(21) Appl. No.: 18/962,254

(22) Filed: Nov. 27, 2024

(65) Prior Publication Data

US 2025/0093632 A1 Mar. 20, 2025

Related U.S. Application Data

(63) Continuation of application No. PCT/KR2022/019587, filed on Dec. 5, 2022.

(30) Foreign Application Priority Data

Oct. 5, 2022 (KR) ........................ 10-2022-0127164
Oct. 13, 2022 (KR) ........................ 10-2022-0131668
Oct. 14, 2022 (KR) ........................ 10-2022-0132630

(51) Int. Cl.
*G02B 21/06* (2006.01)
*G02B 21/00* (2006.01)

(52) U.S. Cl.
CPC ..... *G02B 21/0028* (2013.01); *G02B 21/0032* (2013.01)

(58) Field of Classification Search
CPC ............... G02B 21/00; G02B 21/0004; G02B 21/0012; G02B 21/0016; G02B 21/002;
(Continued)

(56) References Cited

U.S. PATENT DOCUMENTS 7,015,444 B2 * 3/2006 Kawano ............... G02B 21/004 250/201.3
9,280,003 B2 * 3/2016 Anand ............... G02B 21/0032
(Continued)

FOREIGN PATENT DOCUMENTS

JP H08-322784 A 12/1996
JP 2663195 B2 10/1997
(Continued)

OTHER PUBLICATIONS

International Search Report mailed Jun. 29, 2023, in International Application PCT/KR2022/019587, in 5 pages.
(Continued)

*Primary Examiner* — Thong Q Nguyen

(74) *Attorney, Agent, or Firm* — Knobbe, Martens, Olson & Bear, LLP

(57) ABSTRACT

An optical system mounted on a confocal endomicroscope is proposed. The optical system may include a first laser coupled to a first optical fiber and a second laser coupled to a second optical fiber. The optical system may also include an optical fiber coupler that couples the first optical fiber and the second optical fiber into a third optical fiber such that the first beam propagating through the first optical fiber and the second beam propagating through the second optical fiber are simultaneously propagated through the third optical fiber. The optical system may further include an optical propagation module through which the first and second beams output from the optical fiber coupler are propagated.

15 Claims, 19 Drawing Sheets

(58) Field of Classification Search
CPC ............ G02B 21/0024; G02B 21/0028; G02B 21/0032; G02B 21/0052; G02B 21/0064; G02B 21/0088; G02B 21/06; G02B 21/08
USPC .................................................. 359/368–398
See application file for complete search history.

(56) References Cited

U.S. PATENT DOCUMENTS

| | | | | |
|---|---|---|---|---|
| 2016/0124202 A1* | 5/2016 | Huang | G02B 21/02 359/371 |
| 2018/0321145 A1* | 11/2018 | Marcus | G01B 9/02028 |

FOREIGN PATENT DOCUMENTS

| | | | |
|---|---|---|---|
| JP | 2015-527618 A | | 9/2015 |
| KR | 10-2009-0118774 A | | 11/2009 |
| KR | 10-2014-0006464 | * | 1/2014 |
| KR | 10-2014-0068359 A | | 6/2014 |
| KR | 10-1502236 B1 | | 3/2015 |
| KR | 10-2015-0087578 A | | 7/2015 |
| WO | WO2017/146184 A1 | | 8/2017 |

OTHER PUBLICATIONS

Office Action dated Dec. 14, 2022 in Korean Application No. 10-2022-0127164, in 12 pages.
Final Office Action dated Apr. 24, 2023 in Korean Application No. 10-2022-0127164, in 9 pages.
Notice of Allowance dated Dec. 20, 2022 in Korean Application No. 10-2022-0131668, in 5 pages.
Notice of Allowance dated Jan. 30, 2023 in Korean Application No. 10-2022-0132630, in 4 pages.
Notice of Allowance dated Jul. 3, 2023 in Korean Application No. 10-2022-0127164, in 4 pages.

* cited by examiner

PMT
& Socket
PMT
& Socket
101
110
111
112
120
121
122
123
125
126
130
131
132
133
134
140
150
151
152
161
162
171
172
524
525

<When the second beam splitter is positioned within the optical path>

<When the second beam splitter is moved outside the optical path>

OPTICAL SYSTEM MOUNTED ON A CONFOCAL ENDOMICROSCOPE

CROSS-REFERENCE TO RELATED APPLICATIONS

This application is a bypass continuation of International Application No. PCT/KR2022/019587, filed on Dec. 5, 2022, which is based on and claims priority to the following Korean patent applications: Korean Patent Application No. 10-2022-0127164, filed on Oct. 5, 2022; Korean Patent Application No. 10-2022-0131668, filed on Oct. 13, 2022; and Korean Patent Application No. 10-2022-0132630, filed on Oct. 14, 2022, in the Korean Intellectual Property Office, the disclosures of which are incorporated by reference herein in their entireties.

BACKGROUND

Technical Field

The present disclosure relates to an optical system mounted on a confocal endomicroscope and, more specifically, to the structure of an optical system mounted on a confocal endomicroscope equipped with laser beams of either multiple wavelengths or a single wavelength.

Description of Related Technology

Confocal endomicroscopes are used to observe internal organs of the human body, such as the stomach, bronchi, esophagus, duodenum, rectum, etc., which cannot be directly seen by medical professionals, for purposes such as cancer diagnosis or treatment through surgeries.

To observe internal organs of the human body using a confocal endomicroscope, a harmless fluorescent contrast agent is first injected through the capillaries. Once the injected fluorescent contrast agent spreads to the cell tissues via the capillaries, a laser beam is irradiated on the cell tissue (or lesion tissue) while the confocal endomicroscope is in contact with the tissue, and emission light from the cell tissue is received. By performing imaging processing on the received emission light, the cell tissue can be magnified to a microscopic level for observation.

In the process of irradiating a laser beam onto cell tissue for observation using a confocal endomicroscope, laser beams with a single wavelength or multiple wavelengths (e.g., two or more wavelengths) may be utilized.

SUMMARY

To observe cell tissue using a confocal endomicroscope equipped with laser beams of multiple wavelengths, multiple laser beams emitted irradiated or radiated from multiple lasers must be focused onto an optical fiber core.

In this process, to adjust the optical system (or optical members of the optical system) so that all of the multiple laser beams achieve high focusing efficiency, the optical members corresponding to each of the multiple laser beams must be individually adjusted. In other words, adjusting the optical system of a confocal endomicroscope equipped with multi-wavelength laser beams is highly challenging and may require a significant amount of time. Therefore, the production of optical module products equipped with such an optical system may suffer from low productivity and large tolerances between products. Additionally, the presence of numerous optical members corresponding to each of the multiple laser beams may reduce optical efficiency.

Accordingly, structural features of an optical module product are required to efficiently adjust the optical system of a confocal endomicroscope equipped with multi-wavelength laser beams.

An optical system according to an embodiment of the present disclosure, which is mounted on a confocal endomicroscope and outputs a first beam of a first wavelength via a first laser and a second beam of a second wavelength via a second laser to simultaneously irradiate an object, acquires emission light emitted from the object, and processes the acquired emission light, may comprise: the first laser coupled to a first optical fiber and the second laser coupled to a second optical fiber; an optical fiber coupler that combines the first optical fiber and the second optical fiber into a third optical fiber so that the first beam propagating through the first optical fiber and the second beam propagating through the second optical fiber propagate simultaneously through the third optical fiber; and an optical propagation module through which the first beam and the second beam output from the optical fiber coupler propagate. The optical propagation module may include an optical path through which the first beam, the second beam, and the emission light propagate; a plurality of optical members; a first collimator coupled to the third optical fiber; and a second collimator, coupled to a fourth optical fiber and connected to a probe for irradiating the object with the first and second beams.

An optical system according to another embodiment of the present disclosure, which is mounted on a confocal endomicroscope and outputs a first beam of a first wavelength to irradiate an object, acquires emission light emitted from the object, and processes the acquired emission light, may comprise: a first laser coupled to a first optical fiber, and an optical propagation module through which the first beam output from the first laser propagates. The optical propagation module may include an optical path through which the first beam and the emission light propagate; a plurality of optical members; a first collimator coupled to the first optical fiber; and a second collimator, coupled to a second optical fiber and connected to a probe for irradiating the object with the first beam, wherein the second collimator is configured to propagate the first beam through the optical propagation module.

According to one embodiment of the present disclosure, the optical system of a confocal endomicroscope equipped with multi-wavelength laser beams can efficiently focus the multi-wavelength laser beams onto an optical fiber core with high focusing efficiency by including a collimator.

According to one embodiment of the present disclosure, the productivity of optical module products equipped with the optical system of a confocal endomicroscope can be increased, and product tolerances between products can be reduced.

According to one embodiment of the present disclosure, the optical system of a confocal endomicroscope equipped with multi-wavelength laser beams can reduce the number of optical members by including a collimator, thereby increasing optical efficiency.

According to one embodiment of the present disclosure, the optical system of a confocal endomicroscope includes a rail on which optical members can move, enabling users to selectively use a confocal endomicroscope equipped with single-wavelength or multi-wavelength laser beams, thereby enhancing user convenience.

In addition, various effects that are directly or indirectly identified through the present disclosure may be provided.

BRIEF DESCRIPTION OF THE DRAWINGS

FIG. 16 is a diagram for explaining the specifications of a first beam splitter, a second beam splitter, a first filter, and a second filter according to one embodiment.

In the descriptions of the figures, identical or similar reference numerals may be used for identical or similar components.

DETAILED DESCRIPTION

Hereinafter, various embodiments of the present invention will be described with reference to the accompanying drawings. However, this is not intended to limit the present invention to specific embodiments, and it should be understood to include various modifications, equivalents, and/or alternatives of the embodiments of the present invention.

Figure 1:
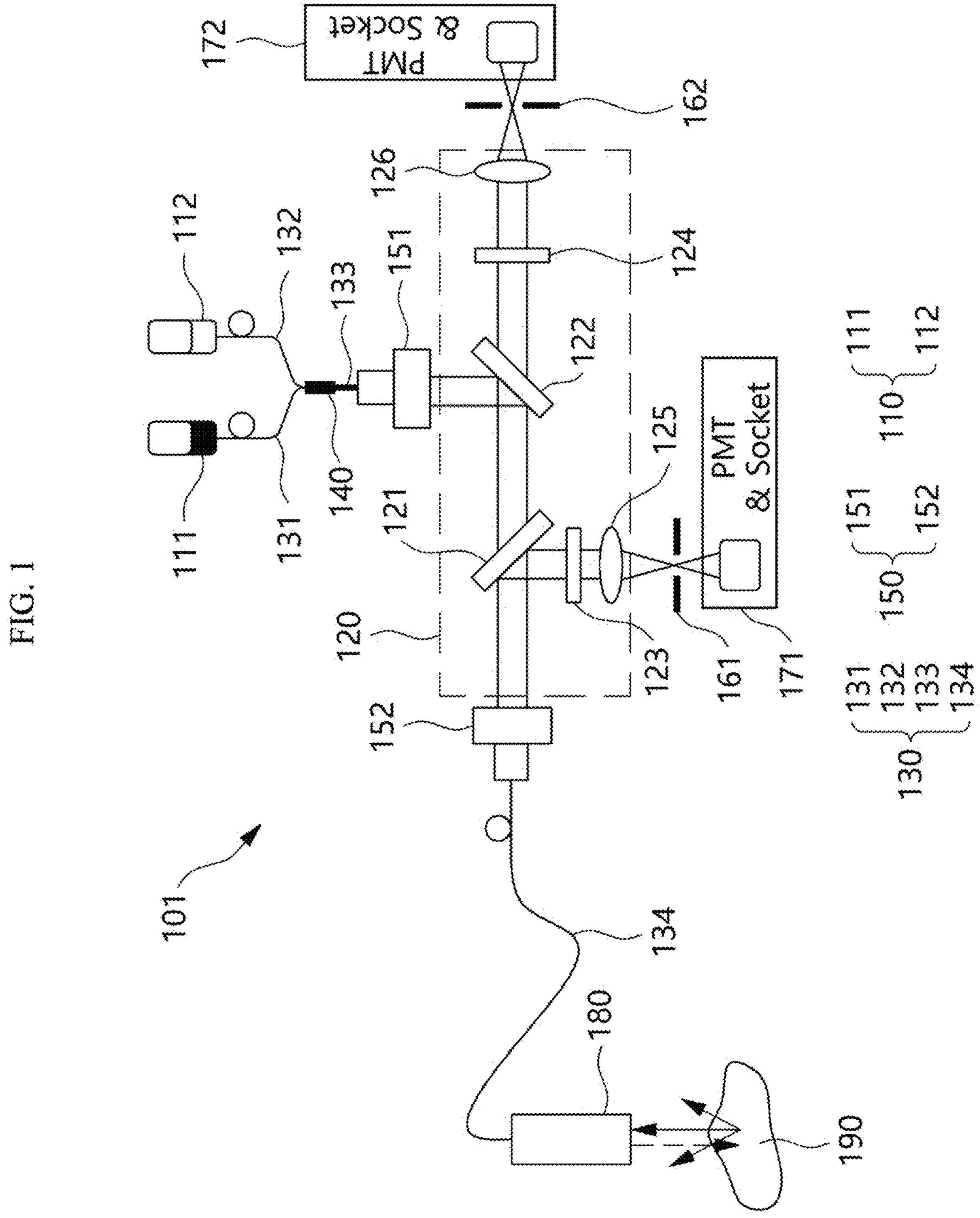
FIG. 1 is a diagram illustrating a multi-wavelength optical system utilizing multiple lasers as light sources according to one embodiment.

FIG. 1 is a diagram illustrating a multi-wavelength optical system utilizing multiple lasers as light sources according to one embodiment.

Referring to FIG. 1, the multi-wavelength optical system 101 (or multi-wavelength confocal endomicroscope) according to one embodiment may include multiple lasers 110, an optical propagation module 120, multiple optical fibers 130, an optical fiber coupler 140, multiple collimators 150, a first pinhole 161, a second pinhole 162, a first photo multiplier tube 171 (or photo detector), a second photo multiplier tube 172, and/or a probe 180.

According to one embodiment, the multiple optical fibers 130 may include a first optical fiber 131, a second optical fiber 132, a third optical fiber 133, and/or a fourth optical fiber 134. The term "optical fiber" as used in the present disclosure may refer to a member through which beams output from multiple lasers 110 pass, are transmitted, or propagate, and may be replaced with the term "connection member."

According to one embodiment, the multiple lasers 110 may include a first laser 111 and a second laser 112. The multiple lasers 110 may serve as light sources in the optical system 101. For example, each of the multiple lasers 110 may be a pigtail laser diode (laser diode, LD).

According to one embodiment, the first laser 111 may emit a first beam (or light) with a first wavelength (e.g., a wavelength between 450 nm and 500 nm). For example, the first laser 111 may emit a first beam with a wavelength corresponding to the first value. This does not imply that the first beam is limited to having only the wavelength value of the first value. For example, the first beam may correspond to light with a wavelength range (e.g., between 450 nm and 500 nm), where the highest peak wavelength value within this range may correspond to the first value. The second laser 112 may emit a second beam (or light) with a second wavelength (e.g., a wavelength between 750 nm and 800 nm). The second laser 112 may emit a second beam with a wavelength corresponding to the second value. This does not imply that the second beam is limited to having only the wavelength value of the second value. For example, the second beam may correspond to light with a wavelength range (e.g., between 750 nm and 800 nm), where the highest peak wavelength value within this range may correspond to the second value. According to one embodiment, the first beam emitted by the first laser 111 may be blue light (e.g., cyan). The second beam emitted by the second laser 112 may be red light.

According to one embodiment, the multiple lasers 110 may be connected to the optical fiber coupler 140. For example, the first laser 111 may be connected to the optical fiber coupler 140 via the first optical fiber 131, and the second laser 112 may be connected to the fiber coupler 140 via the second optical fiber 132.

According to one embodiment, the optical fiber coupler 140 may be connected to the optical propagation module 120. For example, the optical propagation module 120 may be connected to a first collimator 151, and the optical fiber coupler 140 may be connected to the first collimator 151 of the optical propagation module 120 via the third optical fiber 133. Consequently, the optical fiber coupler 140 may be connected to the optical propagation module 120 via the third optical fiber 133 and the first collimator 151. In one embodiment, the first collimator 151 may correspond to a fiber port. The first collimator 151 may include a collimating lens. The collimating lens may refer to a lens that adjusts the light path of incident light to be parallel. The collimating lens included in the first collimator 151 may be an achromatic coating lens to prevent chromatic aberration for two wavelengths.

According to one embodiment, the first beam and the second beam output from the optical fiber coupler 140 may propagate to the optical propagation module 120. For example, the first beam output from the first laser 111 may propagate to the optical propagation module 120 through the first optical fiber 131, the optical fiber coupler 140, the third optical fiber 133, and the first collimator 151. For example, the second beam output from the second laser 112 may propagate to the optical propagation module 120 through the second optical fiber 132, the optical fiber coupler 140, the third optical fiber 133, and the first collimator 151.

According to one embodiment, the optical propagation module 120 may include multiple optical members. For example, the optical propagation module 120 may include a first beam splitter 121, a second beam splitter 122, a first filter 123, a second filter 124, a first lens 125, and/or a second lens 126.

According to one embodiment, a first filter 123 may be disposed between the first beam splitter 121 and the first photo multiplier tube 171. A first lens 125 may be disposed between the first filter 123 and the first photo multiplier tube 171. In one embodiment, a first pinhole 161 may be disposed between the first lens 125 and the first photo multiplier tube 171.

According to one embodiment, a second filter 124 may be disposed between the second beam splitter 122 and the second photo multiplier tube 172. A second lens 126 may be disposed between the second filter 124 and the second photo multiplier tube 172. In one embodiment, a second pinhole 162 may be disposed between the second lens 126 and the second photo multiplier tube 172.

According to one embodiment, the optical propagation module 120 may be connected to a probe 180. For example, the optical propagation module 120 may include a second collimator 152, and the second collimator 152 may be connected to the probe 180 via the fourth optical fiber 134. In one embodiment, the second collimator 152 may correspond to a fiber port. The second collimator 152 may include a collimating lens. The collimating lens may refer to a lens that adjusts the light path of incident light to be parallel. The collimating lens included in the second collimator 152 may be an achromatic coating lens to prevent chromatic aberration for two wavelengths.

According to one embodiment, the first beam emitted from the first laser 111 may be incident on an object 190 (e.g., a cell). The first emission light generated as the first beam irradiates the object 190 may propagate to the first photo multiplier tube 171. For example, the first beam emitted from the first laser 111 may be reflected by the second beam splitter 122. The first beam reflected by the second beam splitter 122 may pass through the first beam splitter 121 and propagate to the probe 180 via the fourth optical fiber 134. The first beam propagated to the probe 180 may be incident on the object 190.

In one example, the first emission light generated as the first beam irradiates the object 190 may propagate to the optical propagation module 120 via the fourth optical fiber 134. The first emission light propagated to the optical propagation module 120 may be reflected by the first beam splitter 121. The first emission light reflected by the first beam splitter 121 may pass through the first filter 123, the first lens 125, and the first pinhole 161, and propagate to the first photo multiplier tube 171. The first photo multiplier tube 171 may amplify the propagated first emission light.

According to one embodiment, the first emission light amplified by the first photo multiplier tube 171 may be used for the observation of the object 190 (e.g., a cell) or for the observation of a lesion associated with the object 190.

According to one embodiment, the first emission light may be generated by the excitation of the first beam. For example, the first emission light generated as the first beam of the first wavelength is incident on the object 190 may have a wavelength higher than the first wavelength.

According to one embodiment, the first filter 123 may correspond to a band-pass filter. The first lens 125 may adjust the focusing of the beam incident on the first lens 125.

According to one embodiment, the second beam emitted from the second laser 112 may be incident on an object 190 (e.g., a cell). The second emission light generated as the second beam irradiates the object 190 may propagate to the second photo multiplier tube 172. For example, the second beam emitted from the second laser 112 may be reflected by the second beam splitter 122. The second beam reflected by the second beam splitter 122 may pass through the first beam splitter 121 and propagate to the probe 180 via the fourth optical fiber 134. The second beam propagated to the probe 180 may be incident on the object 190.

In one example, the second emission light generated as the second beam irradiates the object 190 may propagate to the optical propagation module 120 via the fourth optical fiber 134. The second emission light propagated to the optical propagation module 120 may pass through the first beam splitter 121. The second emission light that has passed through the first beam splitter 121 may pass through the second filter 124, the second lens 126, and the second pinhole 162, and propagate to the second photo multiplier tube 172. The second photo multiplier tube 172 may amplify the propagated second emission light.

According to one embodiment, the second emission light may be generated by the excitation of the second beam. For example, the second emission light generated as the second beam of the second wavelength is incident on the object 190 may have a wavelength higher than the second wavelength.

According to one embodiment, the second emission light amplified by the second photo multiplier tube 172 may be used for the observation of the object 190 (e.g., a cell) or for the observation of a lesion associated with the object 190.

According to one embodiment, the second filter 124 may correspond to a long-pass filter. The second lens 126 may adjust the focusing of the beam incident on the second lens 126.

According to one embodiment, as the optical system 101 includes an optical fiber coupler 140, the beams emitted from the multiple lasers 110 can be easily collected into an optical fiber. For example, if the optical fiber coupler 140 is not included in the optical system 101, the beams emitted from the multiple lasers 110 may be radiated into free space, making it difficult to collect them into a single optical fiber (e.g., the third optical fiber 133). On the other hand, if the optical system 101 according to one embodiment includes the optical fiber coupler 140, the beams emitted from the multiple lasers 110 can be relatively easily collected into a single optical fiber (e.g., the third optical fiber 133) through the optical fiber coupler 140. Consequently, as the optical system 101 includes the optical fiber coupler 140, the efficiency (or optical coupling efficiency) of collecting multiple beams into a single optical fiber may be increased.

The term "optical propagation module" in the present disclosure may be replaced with terms such as "optical propagation circuit," "optical circuit," "confocal endomicroscope," or "optical endoscope circuit."

The term "propagate" in the present disclosure may be replaced with terms such as "transfer," "delivery," or "transmit."

The multiple lasers 110 in the present disclosure have been described as including two lasers (e.g., the first laser 111 and the second laser 112) as an example, but this is merely illustrative. For example, the multiple lasers 110 may further include additional lasers distinct from the first laser 111 and the second laser 112. As an example, the multiple lasers 110 may further include a third laser, which may emit or irradiate a beam with a wavelength different from those of the first laser 111 and the second laser 112.

Figure 2:
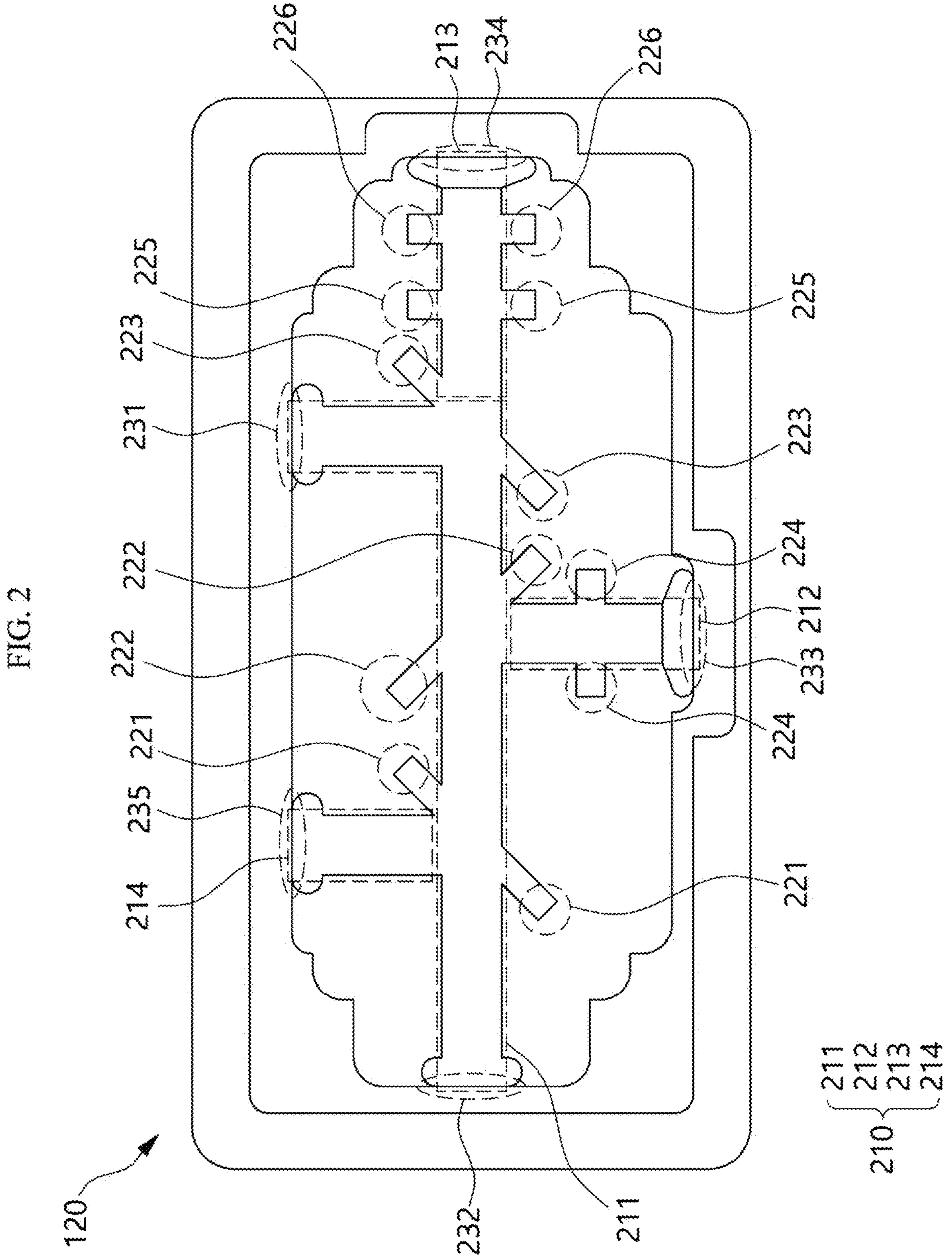
FIG. 2 is a diagram for explaining an optical path included in an optical propagation module according to one embodiment.

FIG. 2 is a diagram for explaining the optical path included in the optical propagation module according to one embodiment.

Referring to FIG. 2, the optical propagation module 120 according to one embodiment may include an optical path 210. The optical path 210 may correspond to the propagation path of the beams emitted from the first laser 111 and/or the second laser 112.

According to one embodiment, the optical path 210 may include a first portion 211, a second portion 212, and/or a third portion 213.

According to one embodiment, the first portion 211 may connect the first collimator 151 and the second collimator 152. For example, the first portion 211 may include a first connection portion 231 and a second connection portion 232. The first connection portion 231 may be connected to the first collimator 151, and the second connection portion 232 may be connected to the second collimator 152. In one example, the first connection portion 231 may be referred to as a coupling part or joint where the first collimator 151 and the first portion 211 are connected, as described later in FIG. 6. In one example, the second connection portion 232 may be referred to as a coupling part or joint where the second collimator 152 and the first portion 211 are connected, as described later in FIG. 6.

According to one embodiment, the second portion 212 may extend from the first portion 211 and be connected to the first photo multiplier tube 171. For example, the second portion 212 may include a third connection portion 233. The third connection portion 233 may be connected to the first photo multiplier tube 171.

According to one embodiment, the third portion 213 may extend from the first portion 211 and be connected to the second photo multiplier tube 172. For example, the third portion 213 may include a fourth connection portion 234. The fourth connection portion 234 may be connected to the second photo multiplier tube 172.

According to one embodiment, grooves for accommodating multiple optical members may be formed in the optical path 210. For example, the first portion 211 may include a first groove 221 for accommodating a beam splitter, a second groove 222 for accommodating the first beam splitter 121, and a third groove 223 for accommodating the second beam splitter 122. For example, the second portion 212 may include a fourth groove 224 for accommodating the first filter 123. For example, the third portion 213 may include a fifth groove 225 and a sixth groove 226 together for accommodating the second filter 124.

According to one embodiment, the optical path 210 may further include a fourth portion 214. In one embodiment, the fourth portion 214 may extend from the first portion 211. The fourth portion 214 may be connected to a fifth connection portion 235 where a third collimator can be coupled. Consequently, the fourth portion 214 may connect the first portion 211 and the fifth connection portion 235.

According to one embodiment, as the optical propagation module 120 includes multiple grooves, the optical propagation module 120 can be selectively used as either a single-wavelength or a multi-wavelength module. For example, when the optical propagation module 120 is used as a single-wavelength module, a beam splitter may be placed in only one of the first groove 221, the second groove 222, or the third groove 223. In another example, when the optical propagation module 120 is used as a multi-wavelength module, beam splitters may be placed in two of the first groove 221, the second groove 222, and the third groove 223. Consequently, the optical propagation module 120 can be selectively utilized as a single-wavelength module or a multi-wavelength module.

Figure 19:
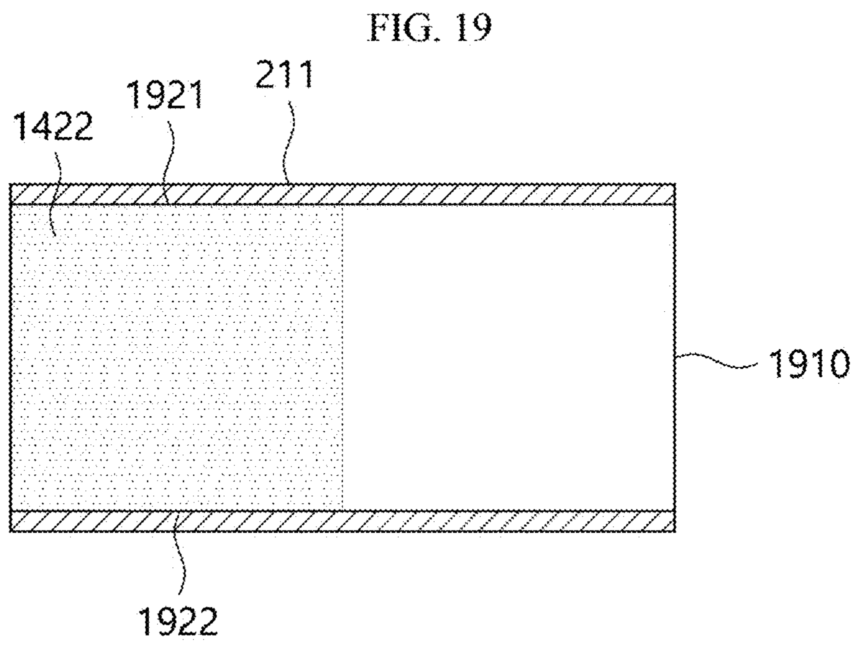
FIG. 19 is a diagram for explaining the movement of a second beam splitter within the optical path according to one embodiment.
Figure 19:
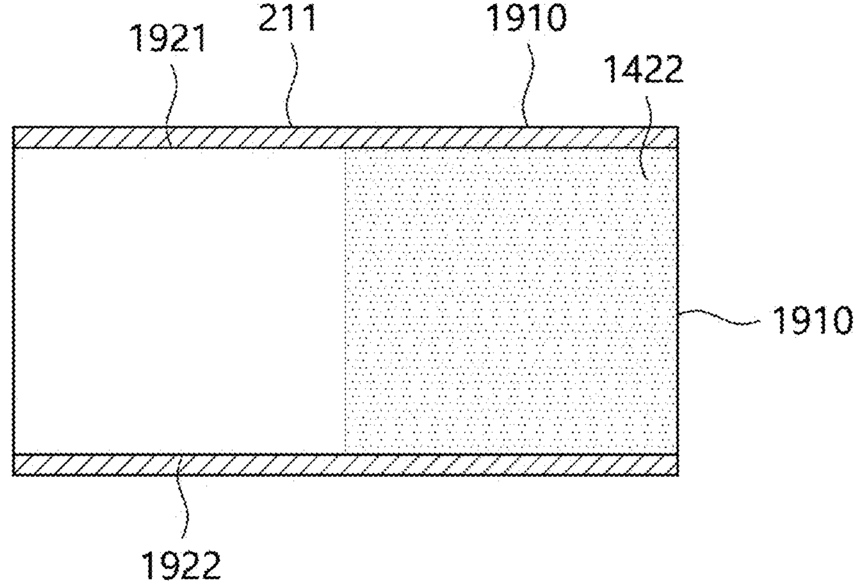

Meanwhile, even when beam splitters are placed in all of the first groove 221, second groove 222, and third groove 223, the embodiment disclosed in FIG. 19 allows for selective utilization as a single-wavelength module or a multi-wavelength module. Detailed information regarding this is described later in FIG. 19.

According to one embodiment, the optical path 210 may have various shapes. For example, the optical path 210 may have a cylindrical shape. However, this is merely an example. For instance, the optical path 210 may have a rectangular prism shape. For example, the first portion 211 of the optical path 210 may have a cylindrical shape, while the second portion 212 of the optical path 210 may have a rectangular prism shape.

According to one embodiment, each of the grooves may have a fixing member disposed therein, and the fixing member may secure the optical member within the groove. For example, a fixing member may be disposed in the third groove 223, and the fixing member may secure the second beam splitter 122, which is disposed in the third groove 223, within the groove.

Figure 3:
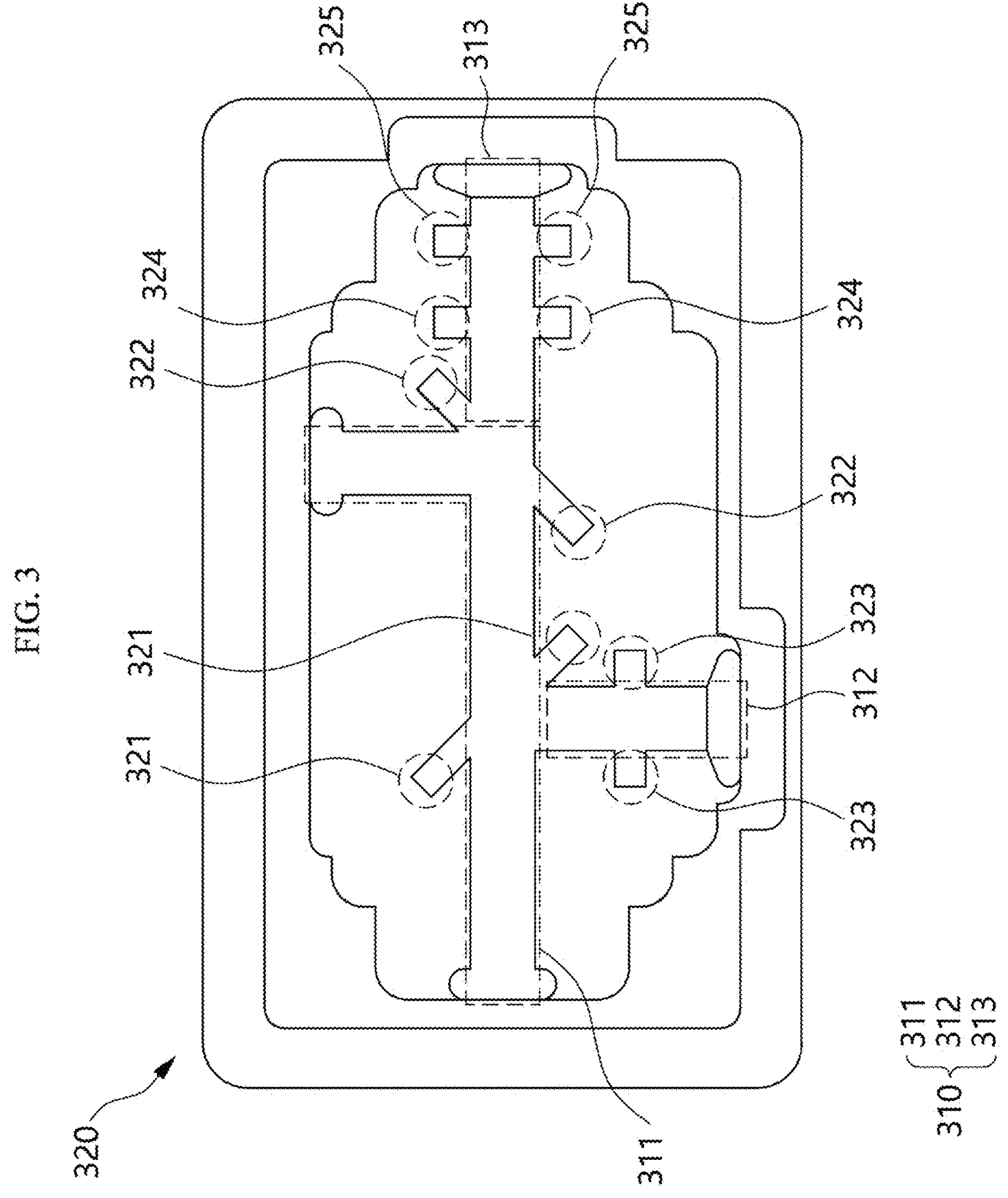
FIG. 3 illustrates an optical propagation module including an optical path according to one embodiment.

In the present disclosure, the optical path 210 has been described as including the first portion 211, the second portion 212, the third portion 213, and the fourth portion 214, but this is merely an example. For example, the optical path 210 may include only the first portion 211, the second portion 212, and the third portion 213, and may not include the fourth portion 214. In FIG. 3, an optical path that does not include the fourth portion 214 is described.

In the present disclosure, the optical path 210 has been described as including the first portion 211, the second portion 212, the third portion 213, and the fourth portion 214, but this is merely an example. For example, the first portion may be replaced with a first optical path, the second portion may be replaced with a second optical path, the third portion may be replaced with a third optical path, and the fourth portion may be replaced with a fourth optical path.

The term "optical path" in the present disclosure may be replaced with terms such as "track," "path," or "duct."

FIG. 3 illustrates an optical propagation module 320 including an optical path according to one embodiment.

Referring to FIG. 3, the optical path 310 according to one embodiment may include a first portion 311, a second portion 312, and a third portion 313.

According to one embodiment, grooves for accommodating multiple optical members may be formed in the optical path 310. For example, the first portion 311 may have a first groove 321 for accommodating the first beam splitter 121 and a second groove 322 for accommodating the second beam splitter 122. For example, the second portion 312 may have a third groove 323 for accommodating the first filter 123. For example, the third portion 313 may have a fourth groove 324 and a fifth groove 325 together for accommodating the second filter 124.

Figure 4:
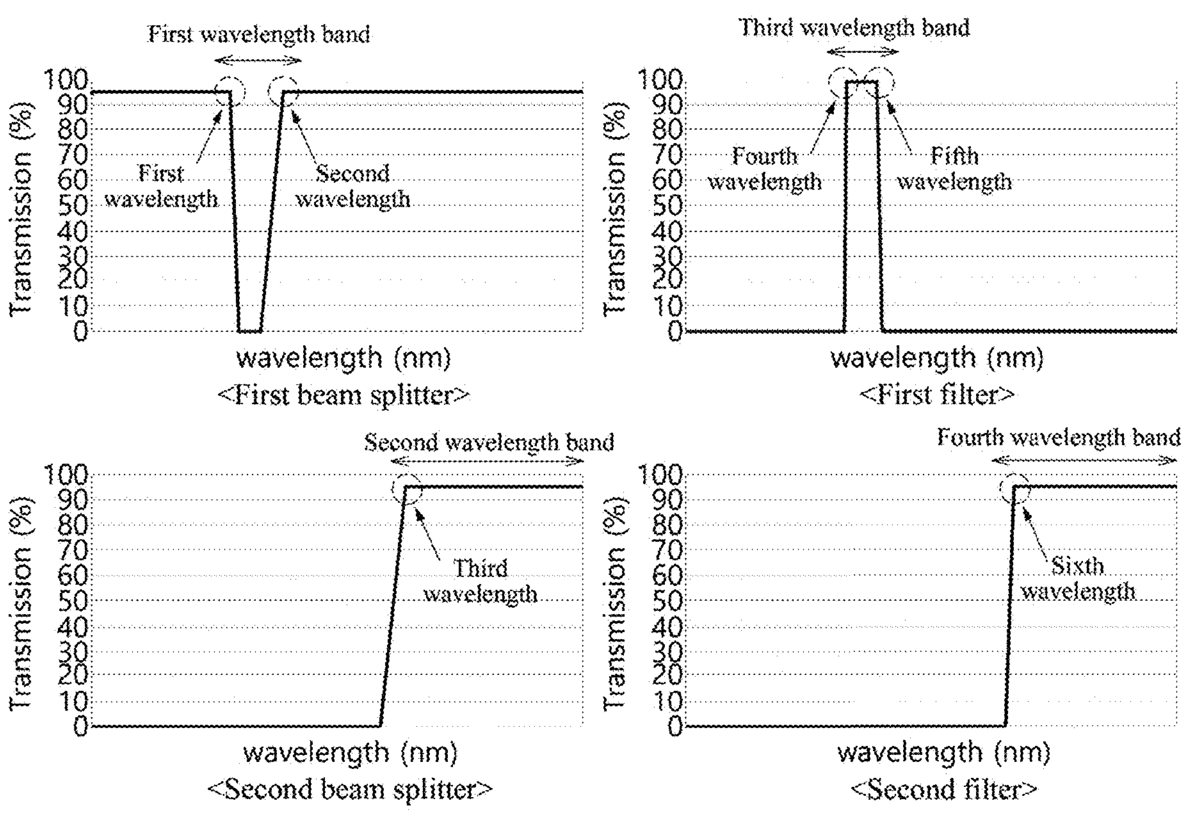
FIG. 4 is a diagram for explaining a first beam splitter, a second beam splitter, a first filter, and a second filter according to one embodiment.

FIG. 4 is a diagram for explaining the first beam splitter, second beam splitter, first filter, and second filter according to one embodiment.

Referring to FIG. 4, the first beam splitter 121 according to one embodiment may block the transmission of a beam having a wavelength corresponding to a first wavelength band between a first wavelength (e.g., a wavelength of approximately 450 nm to 550 nm) and a second wavelength that is greater than the first wavelength (e.g., a wavelength of approximately 550 nm to 650 nm). In other words, the first beam splitter 121 may reflect beams with wavelengths between the first wavelength and the second wavelength.

According to one embodiment, the second beam splitter 122 may transmit beams corresponding to a second wavelength band that is greater than a third wavelength (e.g., a wavelength of approximately 750 nm to 850 nm). The third wavelength (e.g., a wavelength of approximately 750 nm to 850 nm) may be greater than the second wavelength (e.g., a wavelength of approximately 550 nm to 650 nm). The second beam splitter 122 may block the transmission of beams with wavelengths less than the third wavelength. In other words, the second beam splitter 122 may reflect beams with wavelengths less than the third wavelength.

According to one embodiment, the first filter 123 may transmit beams corresponding to a third wavelength band between a fourth wavelength (e.g., a wavelength of approximately 450 nm to 530 nm) and a fifth wavelength that is greater than the fourth wavelength (e.g., a wavelength of approximately 530 nm to 600 nm). The first filter 123 may block beams with wavelengths lower than the fourth wavelength or greater than the fifth wavelength. Therefore, the first filter may correspond to a band-pass filter.

According to one embodiment, the second filter 124 may transmit beams corresponding to a fourth wavelength band greater than a sixth wavelength (e.g., a wavelength of approximately 750 nm to 850 nm). The sixth wavelength may be greater than the fifth wavelength. The second filter 124 may block beams with wavelengths lower than the sixth wavelength. Therefore, the second filter 124 may correspond to a long-pass filter.

According to one embodiment, the first wavelength band of the first beam splitter 121 may at least partially overlap with the third wavelength band of the first filter 123. For example, the first emission light may be reflected by the first beam splitter 121, pass through the first filter 123, and propagate to the first photo multiplier tube 171. Therefore, the first wavelength band and the third wavelength band may at least partially overlap.

According to one embodiment, the second wavelength band of the second beam splitter 122 may at least partially overlap with the fourth wavelength band of the second filter 124. For example, the second emission light may pass through the second beam splitter 122 and the second filter 124 and propagate to the second photo multiplier tube 172. Therefore, the second wavelength band and the fourth wavelength band may at least partially overlap.

Figure 5:
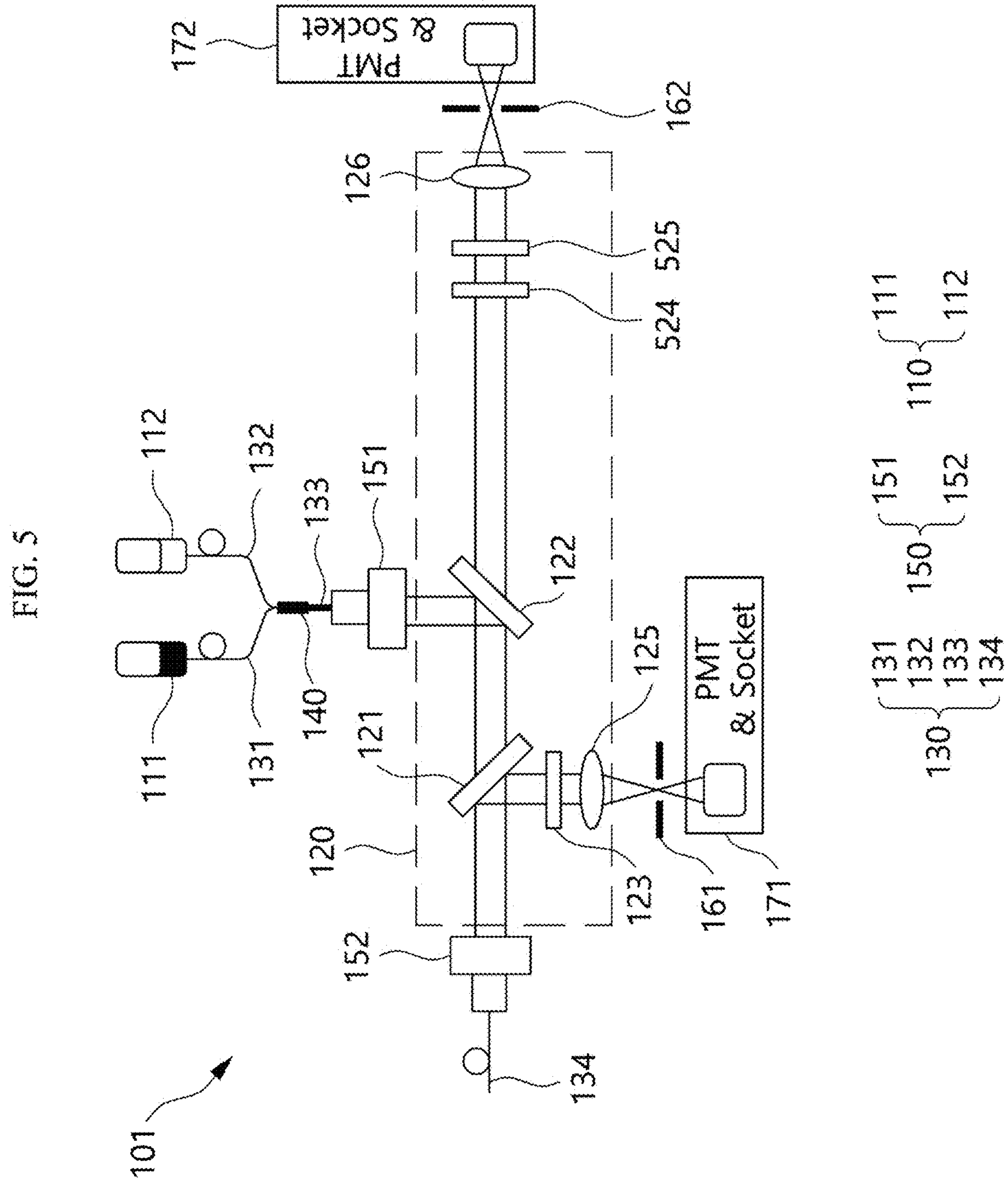
FIG. 5 is a diagram for explaining an optical propagation module including a third filter according to one embodiment.

FIG. 5 illustrates an optical propagation module including a third filter according to one embodiment.

Referring to FIG. 5, the optical propagation module 120 according to one embodiment may include a third filter 524 and/or a fourth filter 525.

The third filter 524 in FIG. 5 of the present disclosure may substantially correspond to the second filter 124 in FIG. 1. In other words, the third filter 524, like the second filter 124, may also correspond to a long-pass filter (LPF). The embodiment shown in FIG. 5 of the present disclosure may be understood as an embodiment in which a fourth filter 525 is added to the embodiment shown in FIG. 1.

According to one embodiment, as the third filter 524 and the fourth filter 525 are disposed between the second beam splitter 122 and the second lens 126, higher filtering efficiency may be achieved compared to when only one filter is used.

According to one embodiment, the first beam splitter 121 may be disposed in the first groove 221 of FIG. 2, and the second beam splitter 122 may be disposed in the third groove 223 of FIG. 2.

Figure 6:
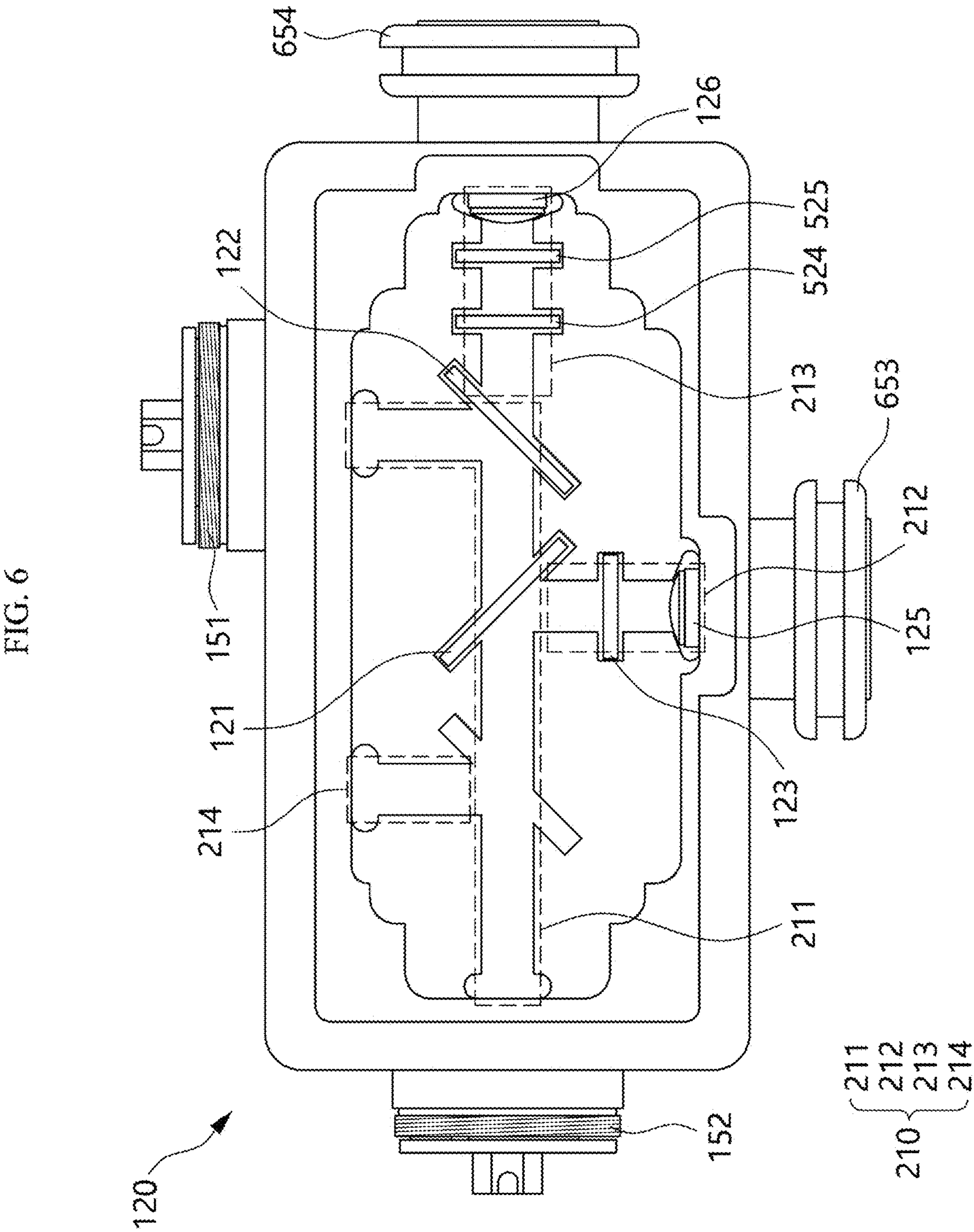
FIG. 6 is a diagram illustrating the arrangement structure of multiple optical members in the optical path of FIG. 5 according to one embodiment.

FIG. 6 illustrates the arrangement structure of multiple optical members in the optical path of FIG. 5 according to one embodiment.

Referring to FIG. 6, the optical propagation module 120 according to one embodiment may include multiple optical members, each of which may be disposed in the optical path 210. In one embodiment, the first beam splitter 121 may be disposed in the first portion 211. The first beam splitter 121 disposed in the first portion 211 may transmit beams passing through the first portion 211. For example, the first beam splitter 121 may transmit the first beam of the first laser 111 and the second beam of the second laser 112. The first beam splitter 121 disposed in the first portion 211 may reflect or transmit emission light passing through the first portion 211. For example, the first beam splitter 121 may reflect the first emission light passing through the first portion 211 and may transmit the second emission light passing through the first portion 211.

According to one embodiment, the second beam splitter 122 may be disposed in the first portion 211. The second beam splitter 122 disposed in the first portion 211 may reflect beams passing through the first portion 211. For example, the second beam splitter 122 may reflect the first beam of the first laser 111 and the second beam of the second laser 112. The second beam splitter 122 disposed in the first portion 211 may transmit emission light passing through the first portion 211. For example, the second beam splitter 122 may transmit the second emission light passing through the first portion 211.

According to one embodiment, the first filter 123 may be disposed in the second portion 212. The first filter 123 disposed in the second portion 212 may be a band-pass filter that transmits a designated wavelength band (e.g., the wavelength band between the third wavelength and the fourth wavelength in FIG. 4). In one embodiment, the first lens 125 may be disposed in the second portion 212, and the first lens 125 may adjust the focusing of the incident first emission light.

According to one embodiment, the third filter 524 may be disposed in the third portion 213. The third filter 524 disposed in the third portion 213 may be a band-pass filter that transmits a designated wavelength (e.g., a wavelength band above the sixth wavelength in FIG. 4). In one embodiment, the second lens 126 may be disposed in the third portion 213, and the second lens 126 may adjust the focusing of the incident second emission light.

According to one embodiment, the fourth filter 525 may be disposed in the third portion 213. The fourth filter 525 disposed in the third portion 213 may be a long-pass filter (LPF) that transmits a designated wavelength (e.g., a wavelength band above the sixth wavelength in FIG. 4).

In FIG. 6 of the present disclosure, the optical propagation module 120 has been described as including both the third filter 524 and the fourth filter 525 in the third portion 213, but this is merely an example. The optical propagation module 120 may include only one of the third filter 524 or the fourth filter 525. In other words, at least one of the third filter 524 or the fourth filter 525 may be omitted.

According to one embodiment, the first portion 211 of the optical path 210 may connect the first collimator 151 and the second collimator 152. The second portion 212 of the optical path 210 may extend from the first portion 211 and connect to the first connection port 653, and the second portion 212 may be connected to the first photo multiplier tube 171 through the first connection port 653. The third portion 213 of the optical path 210 may extend from the first portion 211 and connect to the second connection port 654, and the third portion 213 may be connected to the second photo multiplier tube 172 through the second connection port 654.

Figure 7:
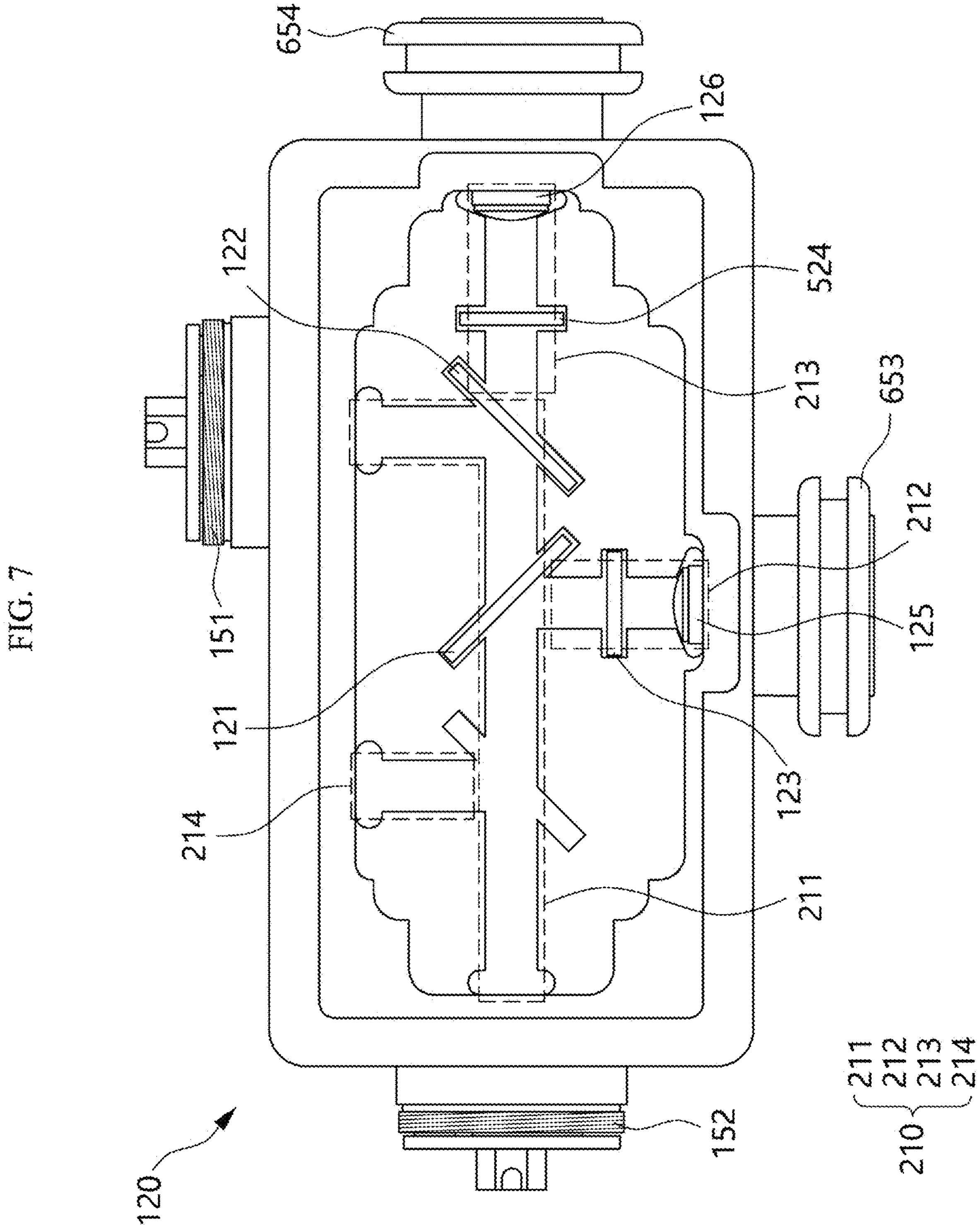
FIG. 7 is a diagram illustrating the arrangement structure of multiple optical members in the optical path according to one embodiment.

FIG. 7 illustrates the arrangement structure of multiple optical members in the optical path according to one embodiment.

Referring to FIG. 7, the optical propagation module 120 according to one embodiment may not include the fourth filter 525 compared to the optical propagation module in FIG. 6.

The embodiment shown in FIG. 7 of the present disclosure may correspond to an embodiment in which the fourth filter 525 has been removed from the embodiment shown in FIG. 6.

Figure 8:
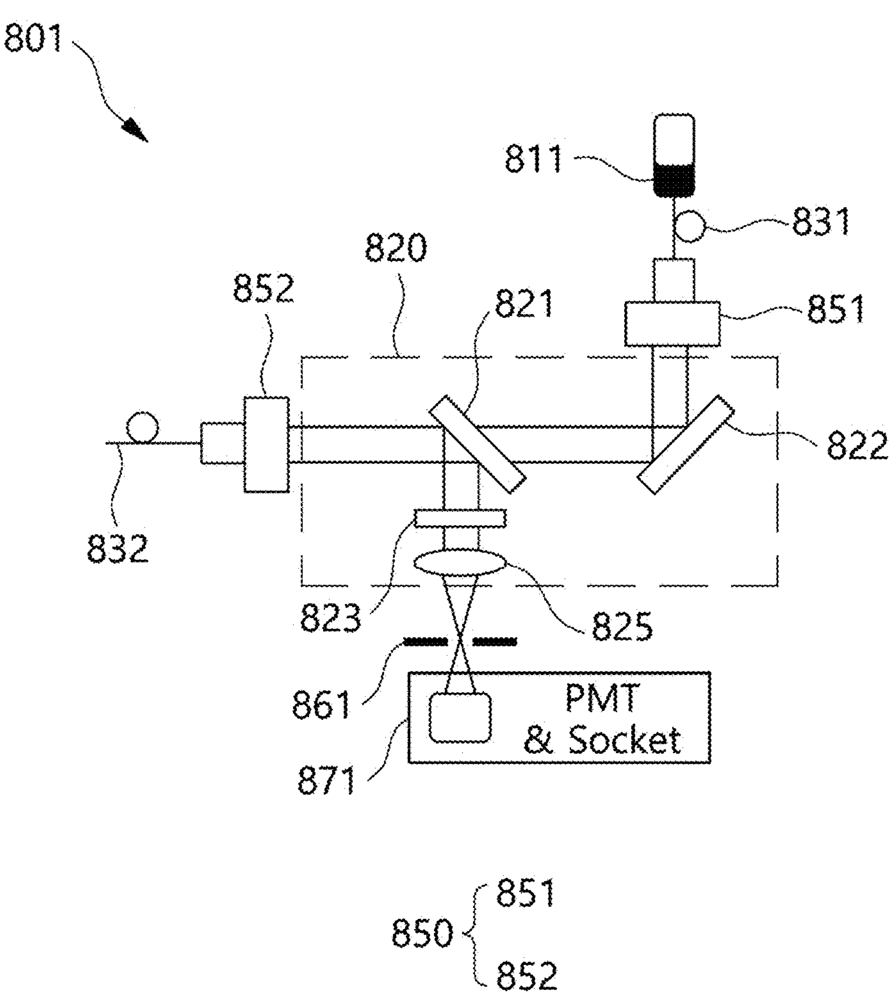
FIG. 8 is a diagram for explaining a single-wavelength optical system utilizing a first laser as a light source according to one embodiment.

FIG. 8 illustrates a single-wavelength optical system using a first laser as a light source according to one embodiment.

Referring to FIG. 8, the single-wavelength optical system 801 (or single-wavelength confocal endomicroscope) according to one embodiment may include a first laser 811, an optical propagation module 820, a first beam splitter 821, a second beam splitter 822, a first optical fiber 831, a second optical fiber 832, multiple collimators 850, a first filter 823, a first lens 825, a first pinhole 861, and/or a first photo multiplier tube 871.

The first laser 811, optical propagation module 820, multiple collimators 850, first filter 823, first lens 825, first pinhole 861, and first photo multiplier tube 871 of FIG. 8 in the present disclosure correspond, in order, to the first laser 111, optical propagation module 120, multiple collimators 150, first filter 123, first lens 125, first pinhole 161, and first photo multiplier tube 171 of FIG. 1. Therefore, the descriptions of the first laser 111, optical propagation module 120, multiple collimators 150, first filter 123, first lens 125, first pinhole 161, and first photo multiplier tube 171 of FIG. 1 can be applied to the first laser 811, optical propagation module 820, multiple collimators 850, first filter 823, first lens 825, first pinhole 861, and first photo multiplier tube 871 of FIG. 8.

The first beam splitter 821 and second beam splitter 822 of FIG. 8 correspond, respectively, to the first beam splitter 121 and second beam splitter 122 of FIG. 1.

According to one embodiment, the first laser 811 may be connected to the first collimator 851 via the first optical fiber 831. In one embodiment, the optical propagation module 820 may be connected to a probe via the second optical fiber 832. The first collimator 851 and the second collimator 852 may each include a collimating lens. The collimating lens refers to a lens that adjusts the optical path of incident light to be parallel. The collimating lenses included in the first collimator 851 and the second collimator 852 shown in FIG. 8 may differ in function from those included in the first collimator 151 and the second collimator 152 shown in FIG. 1. For example, the collimating lenses in FIG. 1 not only adjust the optical path of incident light to be parallel but also function to prevent chromatic aberration between two wavelengths, whereas the collimating lenses in FIG. 8 only have the function of adjusting the optical path of incident light to be parallel.

According to one embodiment, the first beam emitted from the first laser 811 may be reflected by the second beam splitter 822, and the first beam reflected by the second beam splitter 822 may pass through the first beam splitter 821. The transmitted first beam splitter 821 may propagate to the probe through the second collimator 852 and the second optical fiber 832.

According to one embodiment, as the first beam is incident on the object (e.g., object 190 in FIG. 1) from the probe, first emission light may be generated. The first emission light may propagate to the optical propagation module 820 through the second optical fiber 832. The first emission light may be reflected by the first beam splitter 821. The reflected first emission light may propagate through the first filter 823, the first lens 825, and the first pinhole 861 to the first photo multiplier tube 871.

According to one embodiment, since the first emission light has a relatively higher wavelength compared to the first beam, the first beam may pass through the first beam splitter 821, whereas the first emission light may be reflected by the first beam splitter 821 and not pass through it.

According to one embodiment, the first beam splitter 821 may be disposed in the second groove 222 of FIG. 2, and the second beam splitter 822 may be disposed in the third groove 223 of FIG. 2.

Figure 9:
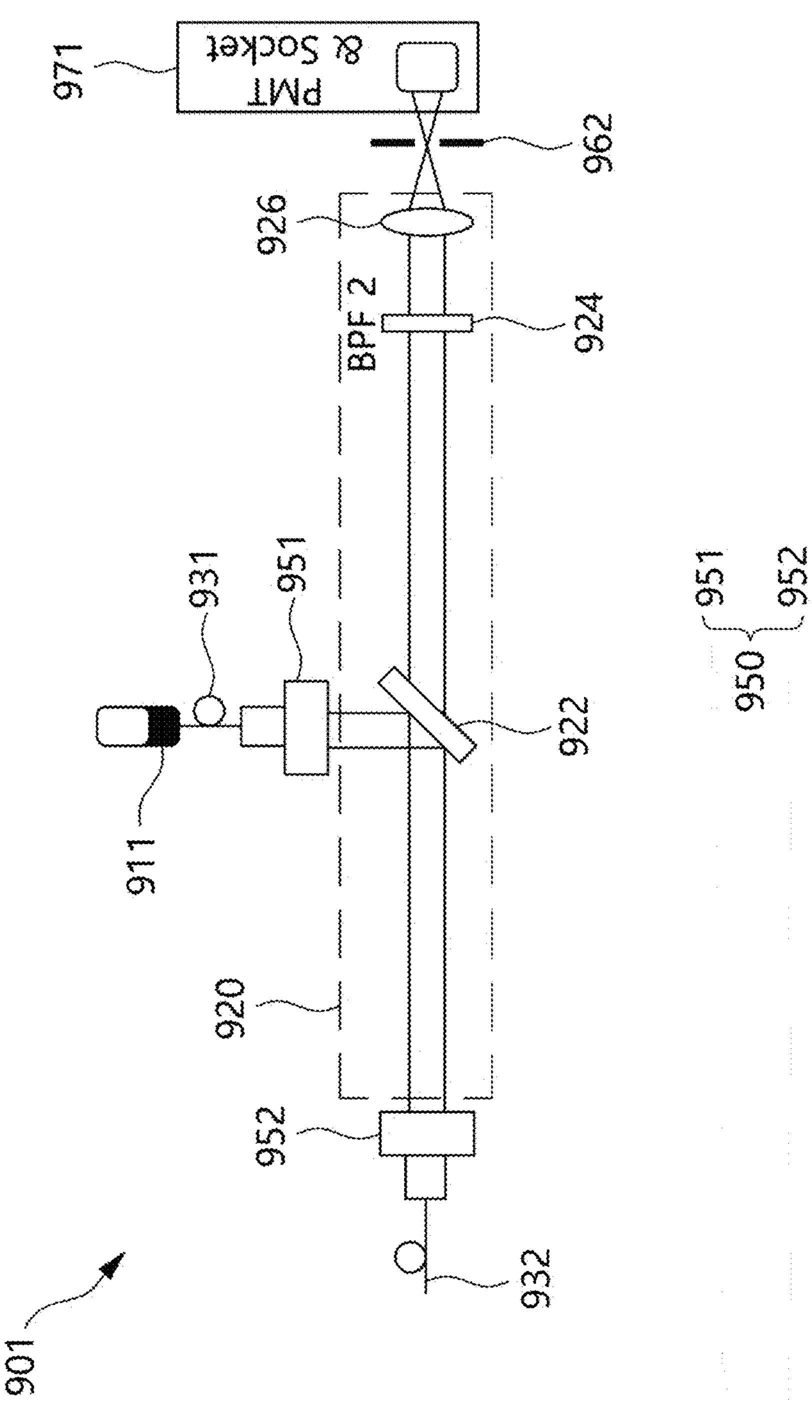
FIG. 9 is a diagram for explaining a single-wavelength optical system utilizing a first laser as a light source according to one embodiment.

FIG. 9 illustrates a single-wavelength optical system using a first laser as a light source according to one embodiment.

Referring to FIG. 9, the single-wavelength optical system 901 (or single-wavelength confocal endomicroscope) according to one embodiment may include a first laser 911, an optical propagation module 920, a first optical fiber 931, a second optical fiber 932, a second beam splitter 922, a second filter (or a band-pass filter 2 (BPF 2) described below), 924, a second lens 926, multiple collimators 950, a second pinhole 962, and/or a first photo multiplier tube 971.

The first laser 911, optical propagation module 920, multiple collimators 950, second beam splitter 922, second lens 926, second pinhole 962, and first photo multiplier tube 971 in FIG. 9 of the present disclosure correspond, in order, to the first laser 111, optical propagation module 120, multiple collimators 150, second beam splitter 122, second lens 126, second pinhole 162, and first photo multiplier tube 171 in FIG. 1. Therefore, the descriptions of the first laser 111, optical propagation module 120, multiple collimators 150, second beam splitter 122, second lens 126, second pinhole 162, and first photo multiplier tube 171 of FIG. 1 can be applied, in sequence, to the first laser 911, optical propagation module 920, multiple collimators 950, second beam splitter 922, second lens 926, second pinhole 962, and first photo multiplier tube 971 of FIG. 9.

According to one embodiment, the second filter 924 may be a band-pass filter.

According to one embodiment, the first laser 911 may be connected to the first collimator 951 via the first optical fiber 931. In one embodiment, the optical propagation module 920 may be connected to a probe via the second optical fiber 932.

According to one embodiment, the first beam emitted from the first laser 911 may be reflected by the second beam splitter 922, and the first beam reflected by the second beam splitter 922 may propagate to the probe through the second collimator 952 and the second optical fiber 932.

According to one embodiment, as the first beam is incident on the object (e.g., object 190 in FIG. 1) from the probe, first emission light may be generated. The first emission light may propagate to the optical propagation module 920 through the second optical fiber 932. The first emission light may pass through the second filter 924, the second lens 926, and the second pinhole 962 to propagate to the first photo multiplier tube 971.

According to one embodiment, the second beam splitter 922 may be disposed in the third groove 223.

Figure 10:
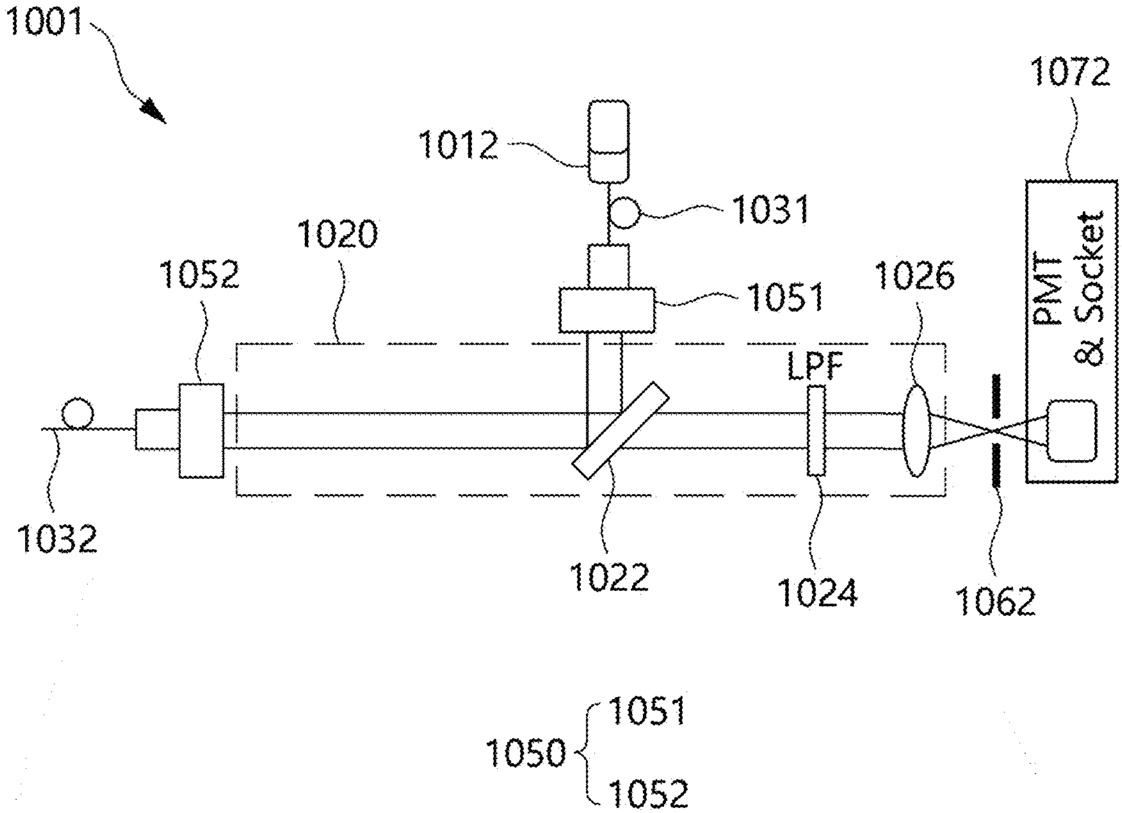
FIG. 10 is a diagram for explaining a single-wavelength optical system utilizing a second laser as a light source according to one embodiment.

FIG. 10 illustrates a single-wavelength optical system using a second laser as a light source according to one embodiment.

Referring to FIG. 10, the single-wavelength optical system 1001 (or single-wavelength confocal endomicroscope) according to one embodiment may include a second laser 1012, an optical propagation module 1020, a first optical fiber 1031, a second optical fiber 1032, a second beam splitter 1022, a second filter (or a long-pass filter (LPF), described above) 1024, a second lens 1026, multiple collimators 1050, a second pinhole 1062, and/or a second photo multiplier tube 1072.

The second laser 1012, optical propagation module 1020, multiple collimators 1050, second beam splitter 1022, second filter 1024, second lens 1026, second pinhole 1062, and second photo multiplier tube 1072 in FIG. 10 of the present disclosure correspond, in order, to the second laser 112, optical propagation module 120, multiple collimators 150, second beam splitter 122, second filter 124, second lens 126, second pinhole 162, and second photo multiplier tube 172 in FIG. 1. Therefore, the descriptions of the second laser 112, optical propagation module 120, multiple collimators 150, second beam splitter 122, second filter 124, second lens 126, second pinhole 162, and second photo multiplier tube 172 of FIG. 1 can be applied, in sequence, to the second laser 1012, optical propagation module 1020, multiple collimators 1050, second beam splitter 1022, second filter 1024, second lens 1026, second pinhole 1062, and second photo multiplier tube 1072 of FIG. 10.

According to one embodiment, the second laser 1012 may be connected to the first collimator 1051 via the first optical fiber 1031. In one embodiment, the optical propagation module 1020 may be connected to a probe via the second optical fiber 1032.

According to one embodiment, the second beam emitted from the second laser 1012 may be reflected by the second beam splitter 1022, and the second beam reflected by the second beam splitter 1022 may propagate to the probe through the second collimator 1052 and the second optical fiber 1032.

According to one embodiment, as the second beam is incident on the object (e.g., object 190 in FIG. 1) from the probe, second emission light may be generated. The second emission light may propagate to the optical propagation module 1020 through the second optical fiber 1032. The second emission light may pass through the second filter 1024, the second lens 1026, and the second pinhole 1062 to propagate to the second photo multiplier tube 1072.

According to one embodiment, the second beam splitter 1022 may be disposed in the third groove 223.

Figure 11:
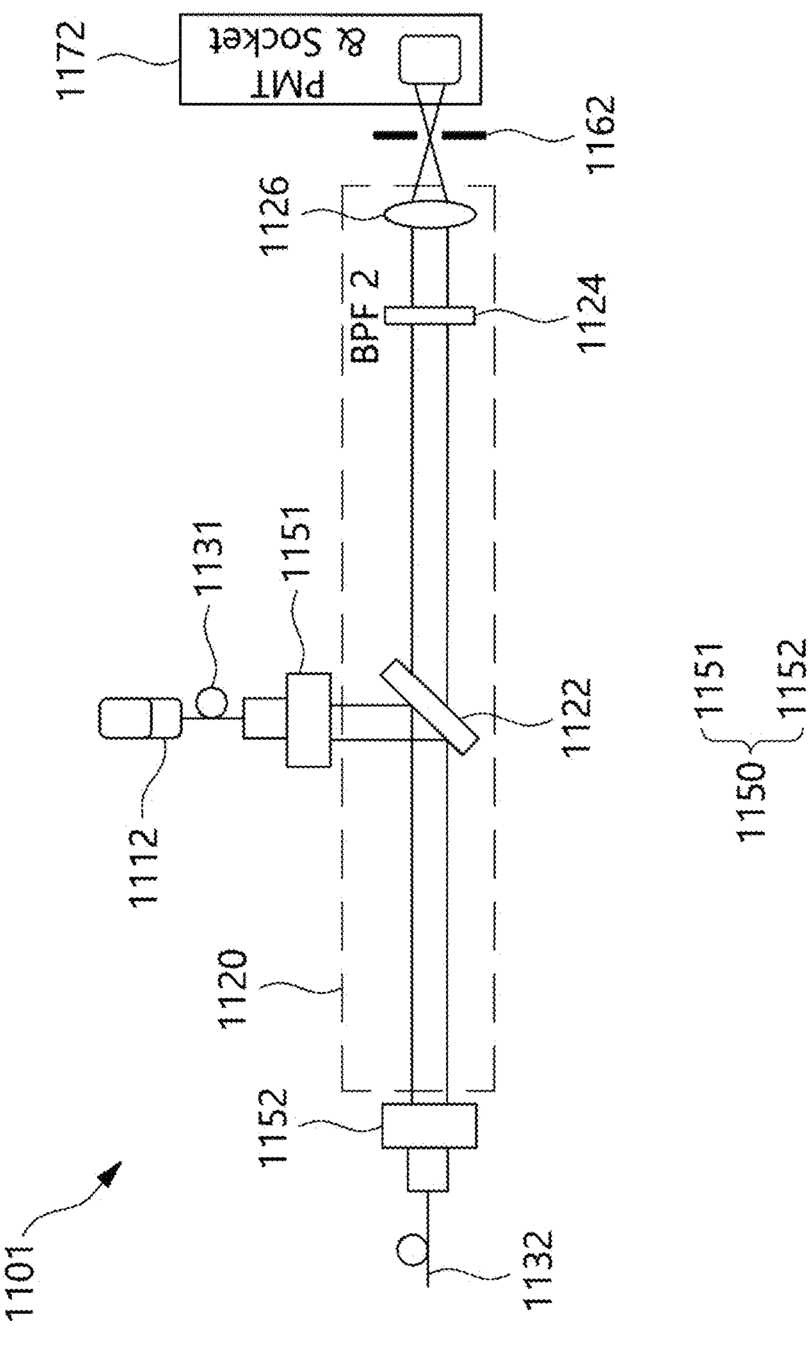
FIG. 11 is a diagram for explaining a single-wavelength optical system utilizing a second laser as a light source according to one embodiment.

FIG. 11 illustrates a single-wavelength optical system using a second laser as a light source according to one embodiment.

Referring to FIG. 11, the single-wavelength optical system 1101 (or single-wavelength confocal endomicroscope) according to one embodiment may include a second laser 1112, an optical propagation module 1120, a first optical fiber 1131, a second optical fiber 1132, a second beam splitter 1122, a second filter (or a band-pass filter 2 (BPF 2), described above) 1124, a second lens 1126, multiple collimators 1150, a second pinhole 1162, and/or a second photo multiplier tube 1172.

The second laser 1112, optical propagation module 1120, multiple collimators 1150, second beam splitter 1122, second lens 1126, second pinhole 1162, and second photo multiplier tube 1172 in FIG. 11 of the present disclosure correspond, in order, to the second laser 112, optical propagation module 120, multiple collimators 150, second beam splitter 122, second lens 126, second pinhole 162, and second photo multiplier tube 172 in FIG. 1. Therefore, the descriptions of the second laser 112, optical propagation module 120, multiple collimators 150, second beam splitter 122, second lens 126, second pinhole 162, and second photo multiplier tube 172 of FIG. 1 can be applied, in sequence, to the second laser 1112, optical propagation module 1120, multiple collimators 1150, second beam splitter 1122, second lens 1126, second pinhole 1162, and second photo multiplier tube 1172 of FIG. 11.

According to one embodiment, the second filter 1124 may be a band-pass filter. Therefore, the second filter 1124 in FIG. 11 of the present disclosure corresponds to the second filter 924 in FIG. 9, and the description of the second filter 924 in FIG. 9 can be applied to the second filter 1124 in FIG. 11.

According to one embodiment, the second laser 1112 may be connected to the first collimator 1151 via the first optical fiber 1131. In one embodiment, the optical propagation module 1120 may be connected to a probe via the second optical fiber 1132.

According to one embodiment, the second beam emitted from the second laser 1112 may be reflected by the second beam splitter 1122, and the second beam reflected by the second beam splitter 1122 may propagate to the probe through the second collimator 1152 and the second optical fiber 1132.

According to one embodiment, as the second beam is incident on the object (e.g., object 190 in FIG. 1) from the probe, second emission light may be generated. The second emission light may propagate to the optical propagation module 1120 through the second optical fiber 1132. The second emission light may pass through the second filter 1124, the second lens 1126, and the second pinhole 1162 to propagate to the second photo multiplier tube 1172.

Figure 12:
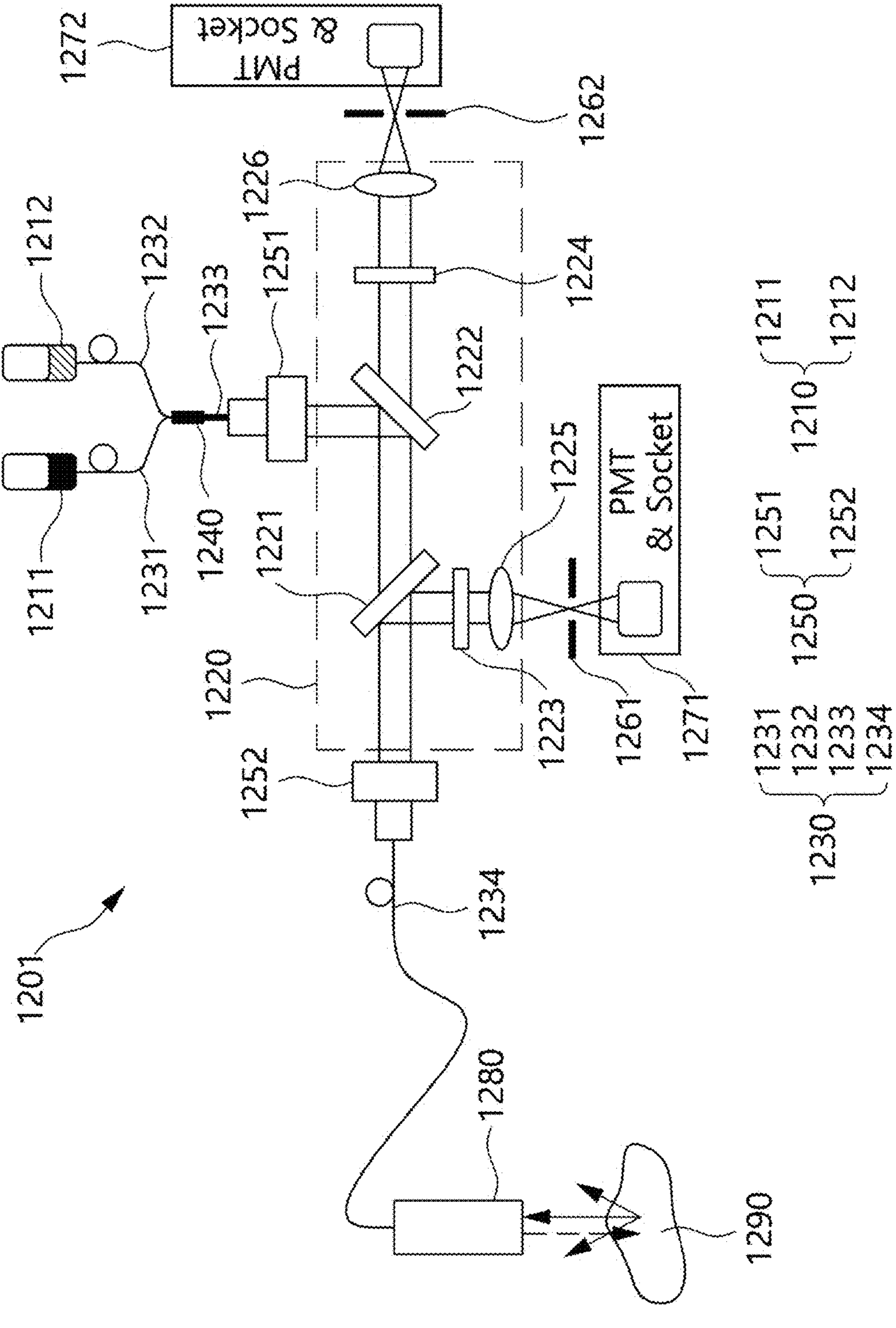
FIG. 12 is a diagram for explaining a multi-wavelength optical system utilizing multiple lasers as light sources according to one embodiment.

FIG. 12 illustrates a multi-wavelength optical system using multiple lasers as light sources according to one embodiment.

Referring to FIG. 12, the multi-wavelength optical system 1201 (or multi-wavelength confocal endomicroscope) according to one embodiment may include multiple lasers 1210, an optical propagation module 1220, multiple optical fibers 1230, an optical fiber coupler 1240, multiple collimators 1250, a first pinhole 1261, a second pinhole 1262, a first photo multiplier tube 1271, a second photo multiplier tube 1272, and/or a probe 1280.

The multiple lasers 1210 in FIG. 12 may include different lasers compared to the multiple lasers 110 in FIG. 1. For example, the multiple lasers 1210 in FIG. 12 may include a first laser 1211 and a second laser 1212. The first laser 1211 may emit a beam with a first wavelength (e.g., a wavelength between 450 nm and 500 nm). The second laser 1212 may emit a beam with a third wavelength (e.g., a wavelength between 350 nm and 450 nm). In contrast, the multiple lasers 110 in FIG. 1 may include a first laser 111 that emits a beam with a first wavelength (e.g., a wavelength between 450 nm and 500 nm) and a second laser 112 that emits a beam with a second wavelength (e.g., a wavelength between 750 nm and 800 nm).

As a result, the embodiment of FIG. 12 may correspond to an embodiment where the second laser 112 of FIG. 1, which emits a beam with a second wavelength (e.g., a wavelength between 750 nm and 800 nm), is replaced by a second laser 1212 that emits a beam with a third wavelength (e.g., a wavelength between 350 nm and 450 nm).

The second filter 1224 in FIG. 12 may differ from the second filter 124 in FIG. 1 by being a band-pass filter. For example, the second filter 124 in FIG. 1 may be a long-pass filter, while the second filter 1224 in FIG. 12 may be a band-pass filter. Additionally, in FIG. 12, the second filter 1224 is described as a single filter; however, this is merely an example. For instance, the optical propagation module 1220 may further include a third filter arranged parallel to the second filter 1224.

According to one embodiment, the multiple lasers 1210 may include a first laser 1211 and a second laser 1212. The multiple lasers 1210 may serve as the light source in the optical system 1201. For example, the multiple lasers 1210 may each be a pigtail laser diode (laser diode, LD).

According to one embodiment, the multiple lasers 1210 may be connected to the optical fiber coupler 1240. For instance, the first laser 1211 may be connected to the optical fiber coupler 1240 via the first optical fiber 1231, and the second laser 1212 may be connected to the optical fiber coupler 1240 via the second optical fiber 1232.

According to one embodiment, the optical fiber coupler 1240 may be connected to the optical propagation module 1220. For example, the optical propagation module 1220 may include a first collimator 1251, and the optical fiber coupler 1240 may be connected to the first collimator 1251 of the optical propagation module 1220 via the third optical fiber 1233. Consequently, the optical fiber coupler 1240 may be connected to the optical propagation module 1220 through the third optical fiber 1233 and the first collimator 1251. In one embodiment, the first collimator 1251 may correspond to a fiber port.

According to one embodiment, the first beam and the second beam output from the optical fiber coupler 1240 can propagate to the optical propagation module 1220. For example, the first beam output from the first laser 1211 can propagate to the optical propagation module 1220 through the first optical fiber 1231, the optical fiber coupler 1240, the third optical fiber 1233, and the first collimator 1251. For example, the second beam output from the second laser 1212 can propagate to the optical propagation module 1220 through the second optical fiber 1232, the optical fiber coupler 1240, the third optical fiber 1233, and the first collimator 1251.

According to one embodiment, the optical propagation module 1220 may include multiple optical components. For instance, the optical propagation module 1220 may include a first beam splitter 1221, a second beam splitter 1222, a first filter 1223, a second filter 1224, a first lens 1225, and/or a second lens 1226.

According to one embodiment, a first filter 1223 may be disposed between the first beam splitter 1221 and the first photo multiplier tube (PMT) 1271. A first lens 1225 may be disposed between the first filter 1223 and the first photo multiplier tube 1271. In one embodiment, a first pinhole 1261 may be disposed between the first lens 1225 and the first photo multiplier tube 1271.

According to one embodiment, a second filter 1224 may be disposed between the second beam splitter 1222 and the second photo multiplier tube 1272. A second lens 1226 may be disposed between the second filter 1224 and the second photo multiplier tube 1272. In one embodiment, a second pinhole 1262 may be disposed between the second lens 1226 and the second photo multiplier tube 1272.

According to one embodiment, the optical propagation module 1220 may be connected to the probe 1280. For example, the optical propagation module 1220 may include a second collimator 1252, and the second collimator 1252 may be connected to the probe 1280 through a fourth optical fiber 1234. In one embodiment, the second collimator 1252 may correspond to a fiber port.

According to one embodiment, the first beam emitted from the first laser 1211 may be incident on the object 1290. The first emission light formed as the first beam irradiates the object 1290 may propagate to the first photo multiplier tube 1271. For example, the first beam emitted from the first laser 1211 may be reflected by the second beam splitter 1222. The first beam reflected by the second beam splitter 1222 may pass through the first beam splitter 1221 and propagate to the probe 1280 via the fourth optical fiber 1234. The first beam propagated to the probe 1280 may be incident on the object 1290.

In one example, the first emission light formed as the first beam irradiates the object 1290 may propagate to the optical propagation module 1220 through the fourth optical fiber 1234. The first emission light propagated to the optical propagation module 1220 may be reflected by the first beam splitter 1221. The first emission light reflected by the first beam splitter 1221 may propagate through the first filter 1223, the first lens 1225, and the first pinhole 1261 to reach the first photo multiplier tube 1271. The first photo multiplier tube 1271 may amplify the propagated first emission light.

According to one embodiment, the first emission light may be formed as a result of excitation by the first beam. For example, the first emission light formed as the first beam with a first wavelength is incident on the object 1290 may have a wavelength higher than the first wavelength (e.g., within the range of 350 nm to 450 nm).

According to one embodiment, the first filter 1223 may be a band-pass filter. The first lens 1225 may adjust the focusing of the beam incident on it.

According to one embodiment, the second beam emitted from the second laser 1212 may be incident on the object. The second emission light formed as the second beam irradiates the object 1290 may propagate to the second photo multiplier tube 1272. For example, the second beam emitted from the second laser 1212 may be reflected by the second beam splitter 1222. The second beam reflected by the second beam splitter 1222 may pass through the first beam splitter 1221 and propagate to the probe 1280 via the fourth optical fiber 1243. The second beam propagated to the probe 1280 may be incident on the object.

In one example, the second emission light formed as the second beam irradiates the object may propagate to the optical propagation module 1220 through the fourth optical fiber 1234. The second emission light propagated to the optical propagation module 1220 may pass through the first beam splitter 1221. The second emission light that has passed through the first beam splitter 1221 may propagate through the second filter 1224, the second lens 1226, and the second pinhole 1262 to reach the second photo multiplier tube 1272. The second photo multiplier tube 1272 may amplify the propagated second emission light.

According to one embodiment, the second emission light may be formed by the excitation of the second beam. For example, the second emission light, formed as the second beam of the second wavelength is incident on the object 1290, may have a wavelength higher than the second wavelength.

According to one embodiment, the second filter 1224 may correspond to a long-pass filter. The second lens 1226 may adjust the focus of the beam incident on it.

According to one embodiment, the first photo multiplier tube 1271 may be a PMT for the first beam of the first wavelength (e.g., a wavelength between 350 nm and 450 nm). For example, the first photo multiplier tube 1271 may receive the first emission light emitted from the object in response to the first beam of the first wavelength (e.g., a wavelength between 350 nm and 450 nm) being incident on the object 1290 and may amplify the first emission light.

According to one embodiment, the second photo multiplier tube 1272 may be a PMT for the second beam of the third wavelength (e.g., a wavelength between 450 nm and 500 nm). For example, the second photo multiplier tube 1272 may receive the second emission light emitted from the object in response to the second beam of the second wavelength (e.g., a wavelength between 450 nm and 500 nm) being incident on the object 1290 and may amplify the second emission light.

Figure 13:
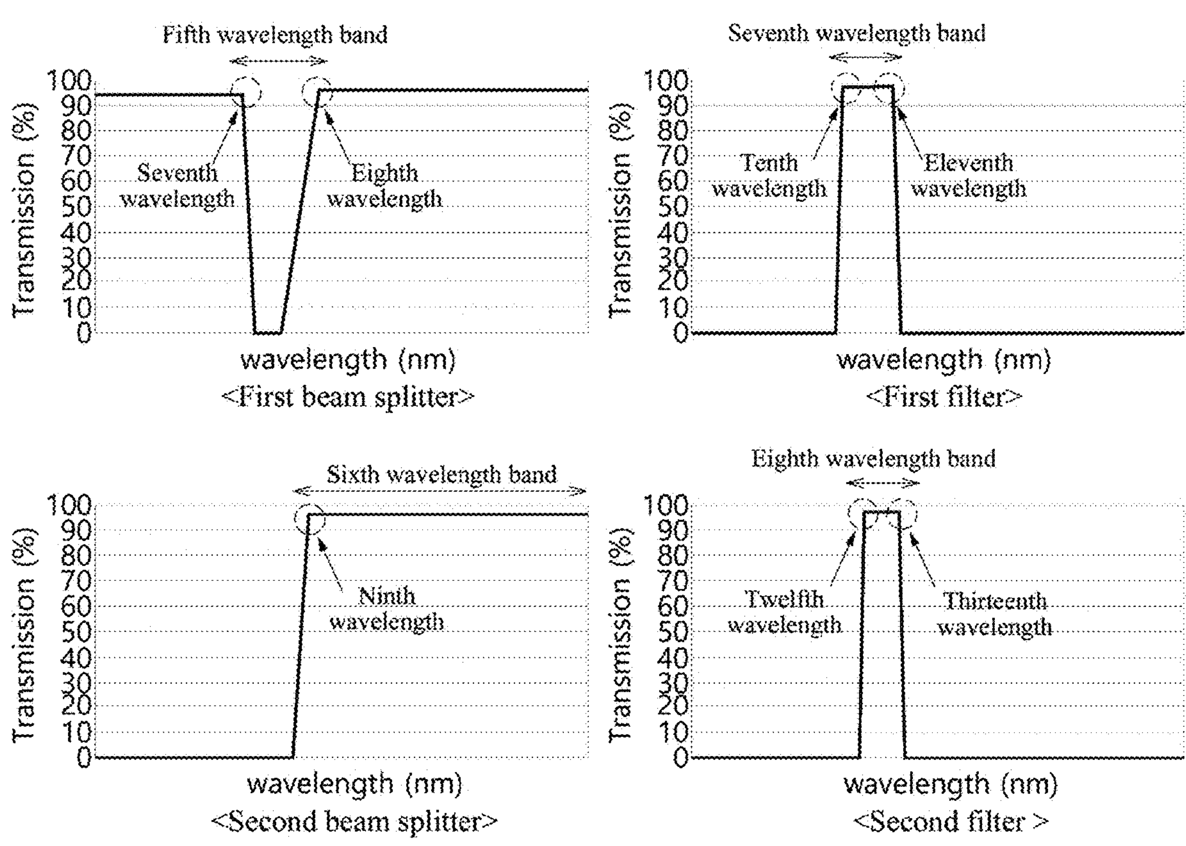
FIG. 13 is a diagram for explaining a first beam splitter, a second beam splitter, a first filter, and a second filter according to one embodiment.

FIG. 13 is a diagram illustrating the first beam splitter, second beam splitter, first filter, and second filter according to an embodiment.

Referring to FIG. 13, the first beam splitter 1221 according to an embodiment may not transmit a beam corresponding to a fifth wavelength band between a seventh wavelength (e.g., a wavelength of approximately 450 nm to 500 nm) and an eighth wavelength larger than the seventh wavelength (e.g., a wavelength of approximately 500 nm to 550 nm). That is, the first beam splitter 1221 may reflect a beam corresponding to the fifth wavelength band between the seventh wavelength and the eighth wavelength.

According to one embodiment, the second beam splitter 1222 may transmit a beam corresponding to a sixth wavelength band greater than the ninth wavelength (e.g., a wavelength of approximately 450 nm to 500 nm) that is larger than the eighth wavelength. The second beam splitter 1222 may not transmit a beam with a wavelength smaller than the ninth wavelength. That is, the second beam splitter 1222 may reflect a beam with a wavelength smaller than the ninth wavelength.

According to one embodiment, the first filter 1223 may transmit a beam corresponding to a seventh wavelength band between a tenth wavelength (e.g., a wavelength of approximately 400 nm to 450 nm) and an eleventh wavelength larger than the tenth wavelength (e.g., a wavelength of approximately 450 nm to 500 nm). The first filter 1223 may block a beam with a wavelength lower than the tenth wavelength or larger than the eleventh wavelength. Therefore, the first filter 1223 may correspond to a band-pass filter.

According to one embodiment, the second filter 1224 may transmit a beam corresponding to an eighth wavelength band between a twelfth wavelength (e.g., a wavelength of approximately 450 nm to 530 nm) and a thirteenth wavelength larger than the twelfth wavelength (e.g., a wavelength of approximately 530 nm to 600 nm). The second filter 1224 may block beams with a wavelength lower than the twelfth wavelength or larger than the thirteenth wavelength. Therefore, the second filter 1224 may correspond to a band-pass filter.

Figure 14:
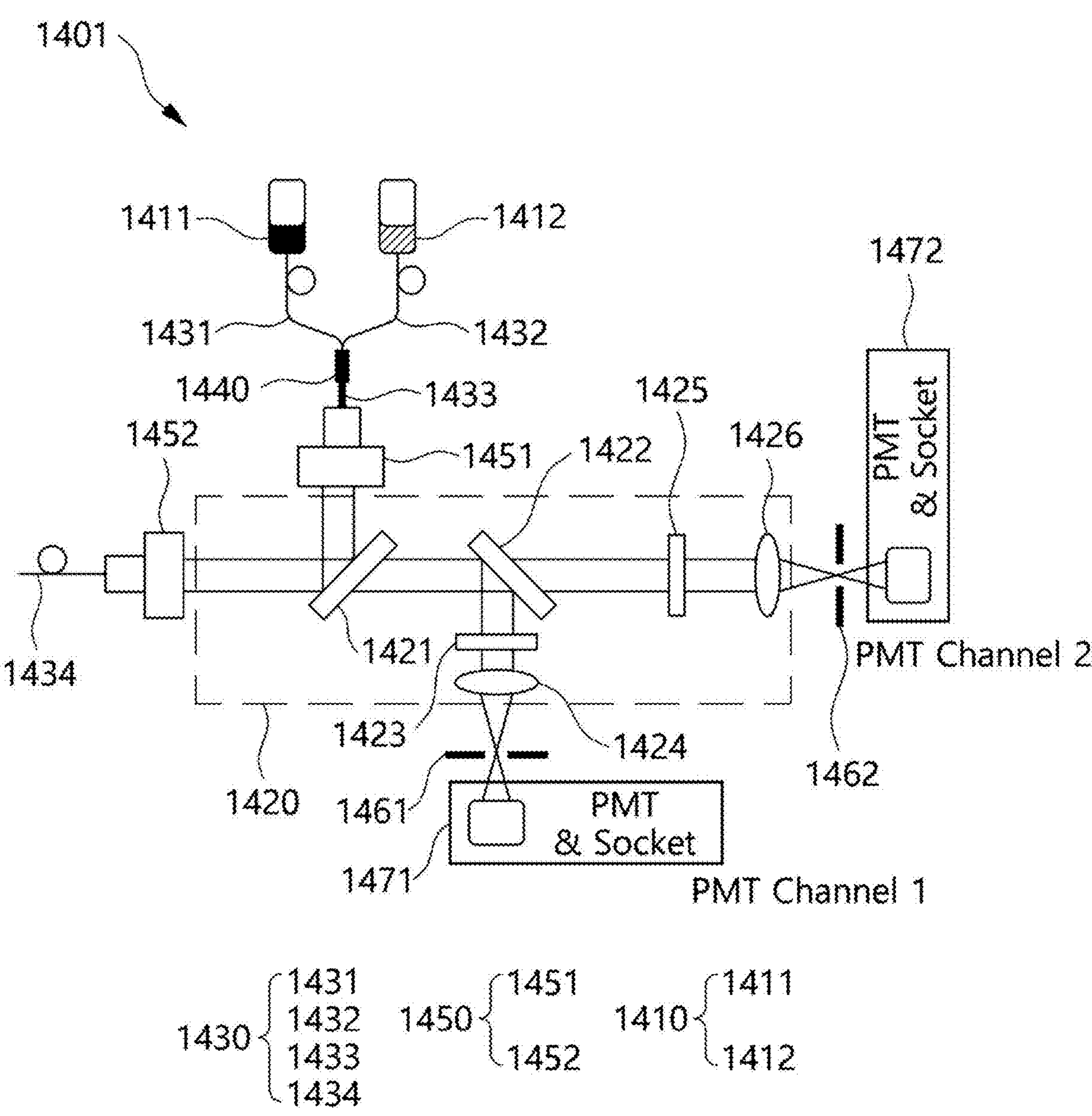
FIG. 14 is a diagram for explaining a first beam splitter, a second beam splitter, a first filter, and a second filter according to one embodiment.

FIG. 14 is a diagram illustrating the first beam splitter, second beam splitter, first filter, and second filter according to an embodiment.

Referring to FIG. 14, a multi-wavelength optical system 1401 (or multi-wavelength confocal endomicroscope) according to one embodiment may include multiple lasers 1410, an optical propagation module 1420, multiple optical fibers 1430, an optical fiber coupler 1440, multiple collimators 1450, a first pinhole 1461, a second pinhole 1462, a first photo multiplier tube 1471, and/or a second photo multiplier tube 1472.

According to one embodiment, the multiple lasers 1410, multiple optical fibers 1430, optical fiber coupler 1440, multiple collimators 1450, first pinhole 1461, second pinhole 1462, first photo multiplier tube 1471, and second photo multiplier tube 1472 of FIG. 14 may correspond in order to the multiple lasers 1210, multiple optical fibers 1230, optical fiber coupler 1240, multiple collimators 1250, first pinhole 1261, second pinhole 1262, first photo multiplier tube 1271, and second photo multiplier tube 1272 of FIG. 12, respectively.

According to one embodiment, the optical propagation module 1420 may include multiple optical components. The multiple optical components may include a first beam splitter 1421, a second beam splitter 1422, a first filter 1423, a first lens 1424, a second filter 1425, and a second lens 1426.

According to one embodiment, the multiple optical components of the optical propagation module 1420 in FIG. 14 may be arranged differently from the optical components of the optical propagation module 1220 in FIG. 12.

For example, the first beam splitter 1421 of FIG. 14 may be positioned in the first groove 221 of FIG. 2. On the other hand, the first beam splitter 1221 of FIG. 12 may be positioned in the second groove 222 of FIG. 2. Additionally, the second beam splitter 1422 of FIG. 14 may be positioned in the second groove 222 of FIG. 2, whereas the second beam splitter 1222 of FIG. 12 may be positioned in the third groove 223.

According to one embodiment, the first beam output from the optical fiber coupler 1440 may be reflected by the first beam splitter 1421. The reflected first beam may propagate to the probe through the fourth optical fiber 1434, and the first beam may be output from the probe and reflected by the object (e.g., the object 190 in FIG. 1). The first emission light formed as the first beam is reflected by the object may propagate to the optical propagation module 1420 through the probe and the fourth optical fiber 1434. The first emission light may pass through the first beam splitter 1421, the second beam splitter 1422, the second filter 1425, the second lens 1426, and the second pinhole 1462. The transmitted first emission light may propagate to the second photo multiplier tube 1472.

According to one embodiment, the second beam output from the optical fiber coupler 1440 may be reflected by the first beam splitter 1421. The reflected second beam may propagate to the probe through the fourth optical fiber 1434, and the second beam may be output from the probe and reflected by the object (e.g., the object 190 in FIG. 1). The second emission light formed as the second beam is reflected by the object may propagate to the optical propagation module 1420 through the probe and the fourth optical fiber 1434. The second emission light may pass through the first beam splitter 1421 and be reflected by the second beam splitter 1422. The reflected second emission light may pass through the first filter 1423, the first lens 1424, and the first pinhole 1461 and propagate to the first photo multiplier tube 1471.

Figure 15:
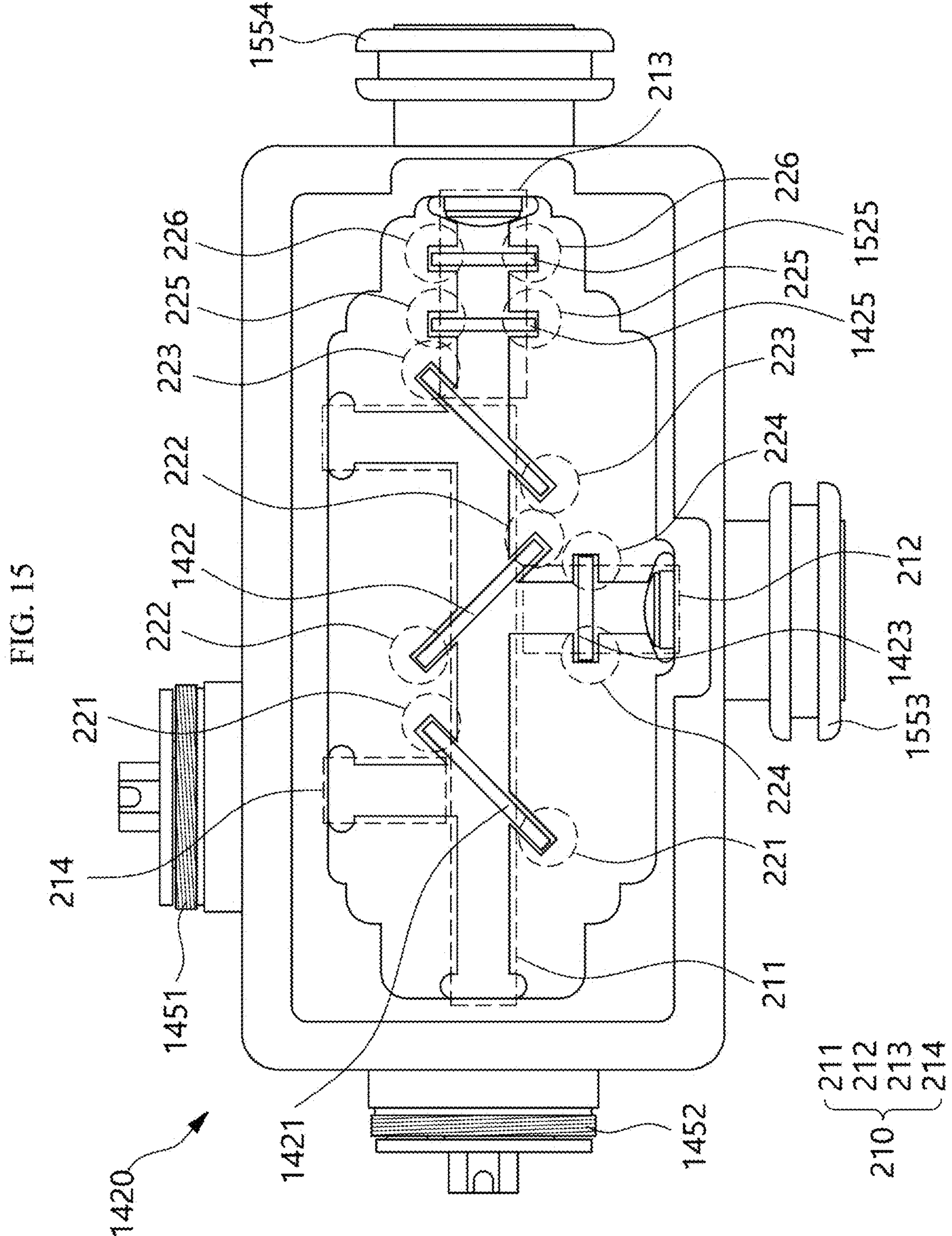
FIG. 15 is a diagram illustrating the positions of multiple optical members within an optical system according to one embodiment.

FIG. 15 is a diagram illustrating the positions of multiple optical components within an optical system according to an embodiment.

Referring to FIG. 15, the first collimator 1451 according to one embodiment may be connected to the fourth portion 214 of the optical path 210. The second collimator 1452 may be connected to the first portion 211 of the optical path 210. In one embodiment, the first connection port 1553 for connection with the first photo multiplier tube 1471 may be connected to the second portion 212. The second connection port 1554 for connection with the second photo multiplier tube 1472 may be connected to the third portion 213.

According to one embodiment, the first beam splitter 1421 may be positioned in the first groove 221, and the second beam splitter 1422 may be positioned in the second groove 222. The first filter 1423 may be positioned in the fourth groove 224, and the second filter 1425 may be positioned in the fifth groove 225.

According to one embodiment, the optical propagation module 1420 may additionally include a third filter 1525, in addition to the second filter 1425. The third filter 1525 may be substantially the same as the second filter 1425, functioning as a band-pass filter. The third filter 1525 may be positioned in the sixth groove 226.

Although the optical propagation module 1420 is described in FIG. 15 as including both the second filter 1425 and the third filter 1525, this is merely an example. For instance, the optical propagation module 1420 may include only one of the second filter 1425 or the third filter 1525.

Figure 16:
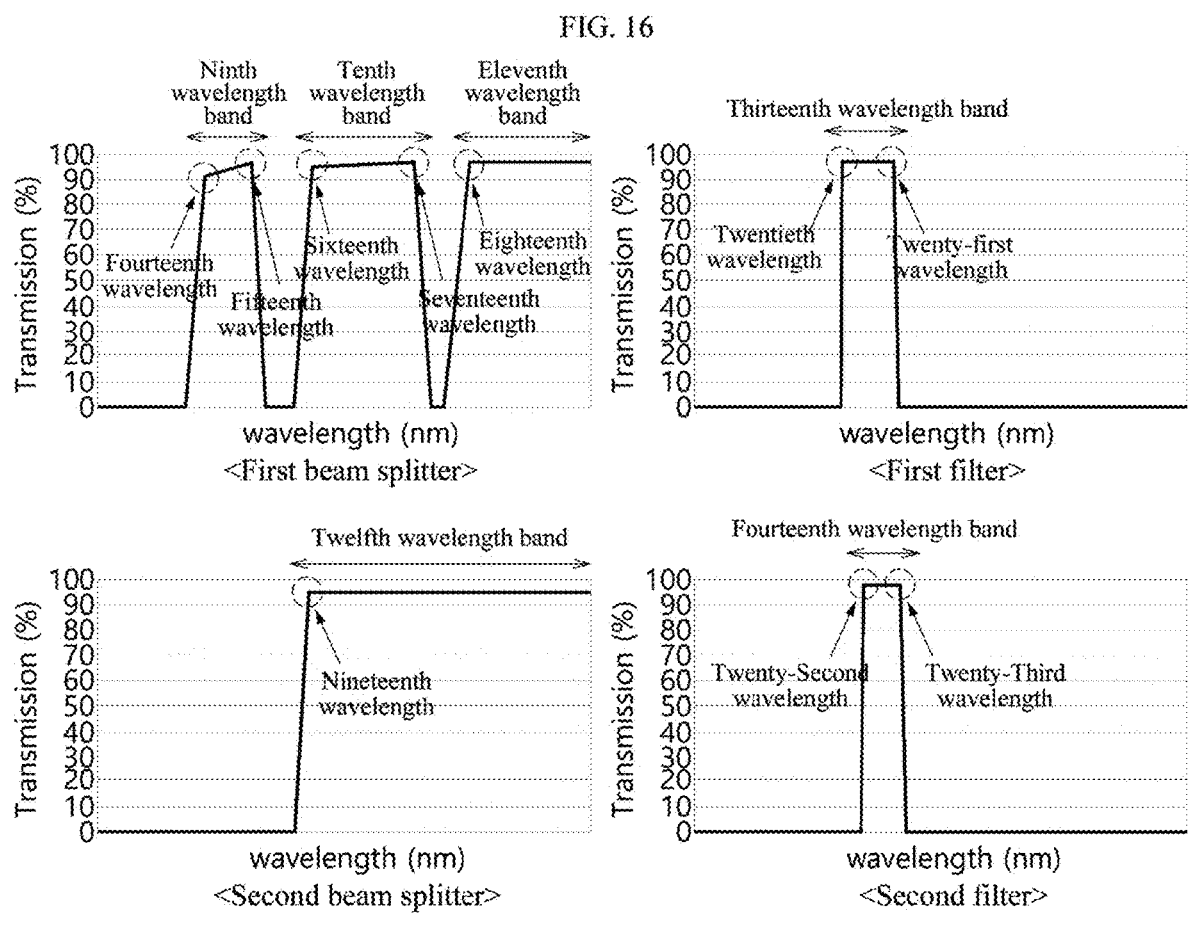

FIG. 16 is a diagram illustrating the specifications of the first beam splitter, second beam splitter, first filter, and second filter according to an embodiment.

Referring to FIG. 16, the first beam splitter 1421 according to one embodiment may transmit a ninth wavelength band between a fourteenth wavelength (e.g., a wavelength of approximately 400 nm to 450 nm) and a fifteenth wavelength (e.g., a wavelength of approximately 450 nm to 500 nm). The first beam splitter 1421 may transmit a tenth wavelength band between a sixteenth wavelength (e.g., a wavelength of approximately 500 nm to 550 nm) and a seventeenth wavelength (e.g., a wavelength of approximately 550 nm to 600 nm). The first beam splitter 1421 may transmit an eleventh wavelength band greater than an eighteenth wavelength (e.g., a wavelength of approximately 600 nm to 650 nm). As a result, the first beam splitter 1421 may have band-pass characteristics that allow the transmission of multiple wavelength bands.

According to one embodiment, the second beam splitter 1422 may transmit a twelfth wavelength band greater than a nineteenth wavelength (e.g., a wavelength of approximately 450 nm to 500 nm). As a result, the second beam splitter 1422 may have long-pass characteristics.

According to one embodiment, the first filter 1423 may transmit a thirteenth wavelength band between a twentieth wavelength (e.g., a wavelength of approximately 400 nm to 450 nm) and a twenty-first wavelength (e.g., a wavelength of approximately 450 nm to 500 nm). As a result, the first filter 1423 may be a band-pass filter.

According to one embodiment, the second filter 1425 may transmit a fourteenth wavelength band between a twenty-second wavelength (e.g., a wavelength of approximately 450 nm to 530 nm) and a twenty-third wavelength (e.g., a wavelength of approximately 530 nm to 600 nm). As a result, the second filter 1425 may be a band-pass filter.

Figure 17:
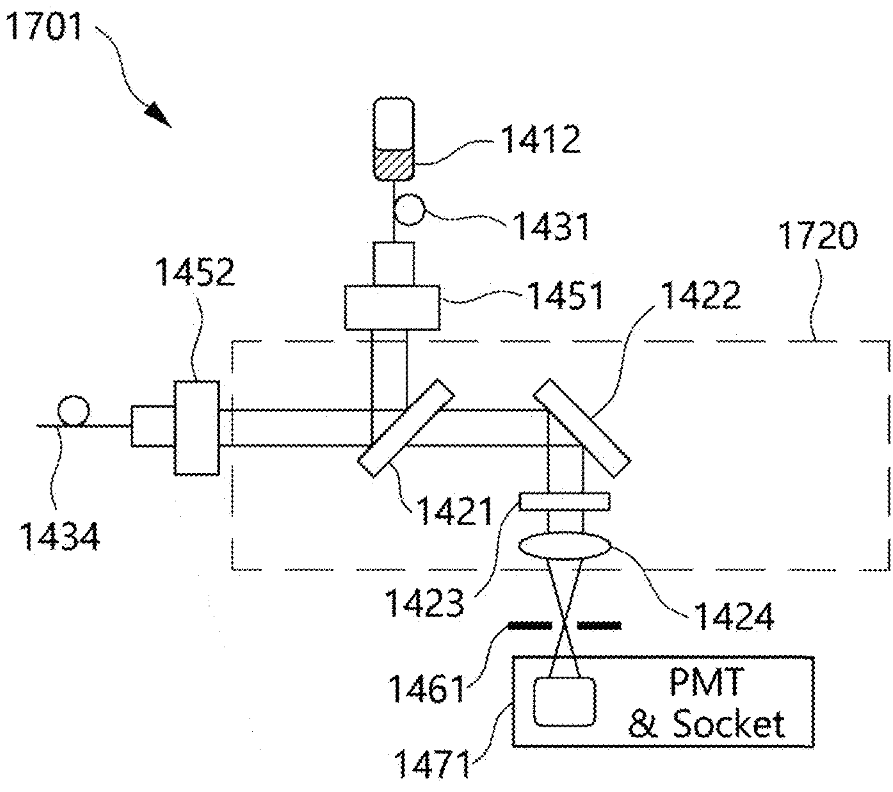
FIG. 17 is a diagram for explaining an optical system including a single laser according to one embodiment.

FIG. 17 is a diagram illustrating an optical system including a single laser according to an embodiment.

Referring to FIG. 17, an optical system (or confocal endomicroscope) 1701 according to one embodiment may include a second laser 1412, an optical propagation module 1720, a first collimator 1451, and/or a second collimator 1452.

According to one embodiment, the second laser 1412 may emit or irradiate a beam of a third wavelength (e.g., 405 nm).

According to one embodiment, the second laser 1412 may be connected to the first collimator 1451 via a first optical fiber 1431. In one embodiment, since the first collimator 1451 is connected to the optical propagation module 1720, the second laser 1412 may consequently be connected to the optical propagation module 1720 through the first optical fiber 1431 and the first collimator 1451.

According to one embodiment, the optical propagation module 1720 may be connected to a second optical fiber 1432 through the second collimator 1452, and consequently, the optical propagation module 1720 may be connected to a probe via the second optical fiber 1432.

According to one embodiment, the optical propagation module 1720 may include a first beam splitter 1421, a second beam splitter 1422, a first filter 1423, and a first lens 1424.

According to one embodiment, the beam of the third wavelength (e.g., a wavelength between 350 nm and 450 nm) emitted from the second laser 1412 may be reflected by the first beam splitter 1421 and propagate to the second collimator 1452 and the second optical fiber 1432. The propagated beam may be irradiated onto an object (e.g., the object 190 in FIG. 1), and emission light may be generated. The generated emission light may propagate to the second optical fiber 1432 through the probe. The emission light may pass through the first beam splitter 1421 and be reflected by the second beam splitter 1422. The reflected emission light may pass through the first filter 1423 and the first pinhole 1461 and propagate to the first photo multiplier tube 1471.

According to one embodiment, the beam of the third wavelength (e.g., a wavelength between 350 nm and 450 nm) emitted from the second laser 1412 may be reflected by the first beam splitter 1421, but the emission light passes through the first beam splitter 1421 because the emission light has a relatively higher wavelength compared to the beam of the third wavelength. In other words, as the beam of the third wavelength is reflected by the object, the emission light may be excited and may have a relatively higher wavelength than the beam of the third wavelength.

According to one embodiment, the first beam splitter 1421 may be positioned in the first groove 221 of FIG. 2, and the second beam splitter 1422 may be positioned in the second groove 222 of FIG. 2.

Figure 18:
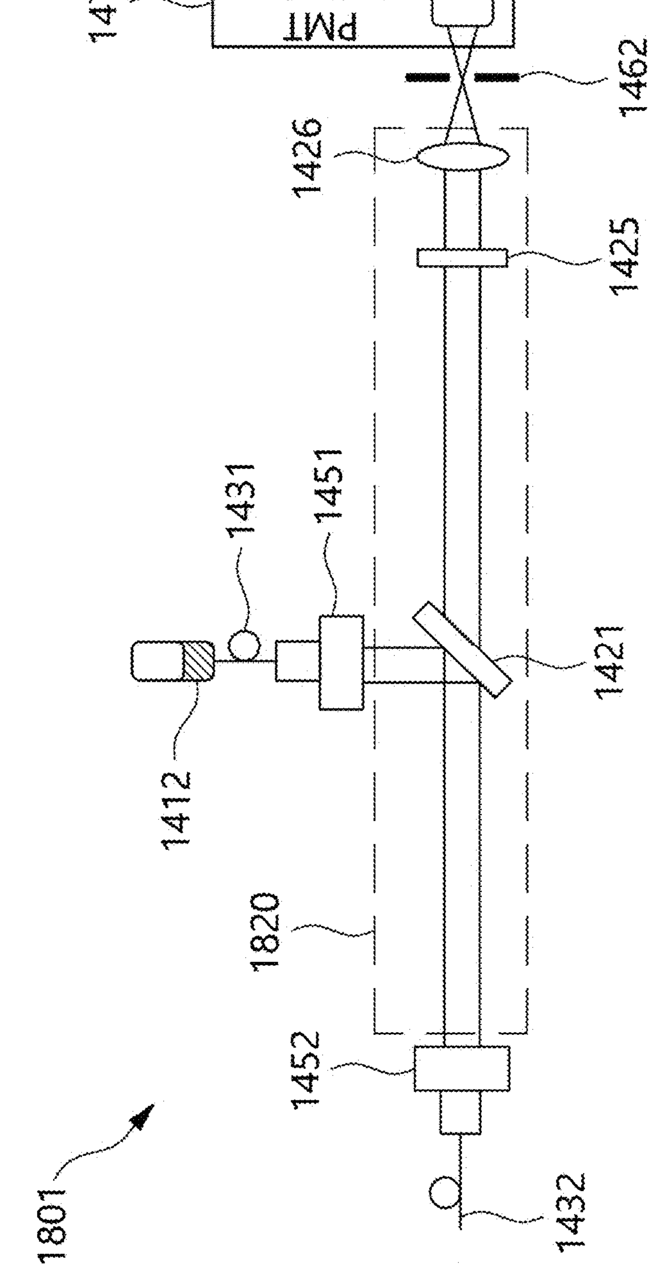
FIG. 18 is a diagram for explaining an optical system including a single laser according to one embodiment.

FIG. 18 is a diagram illustrating an optical system including a single laser according to an embodiment.

Referring to FIG. 18, an optical system (or confocal endomicroscope) 1801 according to one embodiment may include a second laser 1412, an optical propagation module 1820, a first collimator 1451, and/or a second collimator 1452.

According to one embodiment, the second laser 1412 may emit or irradiate a beam of a third wavelength (e.g., a wavelength between 350 nm and 450 nm).

According to one embodiment, the second laser 1412 may be connected to the first collimator 1451 via a first optical fiber 1431. In one embodiment, since the first collimator 1451 is connected to the optical propagation module 1820, the second laser 1412 may consequently be connected to the optical propagation module 1820 through the first optical fiber 1431 and the first collimator 1451.

According to one embodiment, the optical propagation module 1820 may be connected to a second optical fiber 1432 through the second collimator 1452, and consequently, the optical propagation module 1720 may be connected to a probe via the second optical fiber 1432.

According to one embodiment, the optical propagation module 1820 may include a first beam splitter 1421, a second filter 1425, and a first lens 1426.

According to one embodiment, the beam of the third wavelength (e.g., a wavelength between 350 nm and 450 nm) emitted from the second laser 1412 may be reflected by the first beam splitter 1421 and propagate to the second collimator 1452 and the second optical fiber 1432. The propagated beam may be irradiated onto an object (e.g., the object 190 in FIG. 1), and emission light may be generated. The generated emission light may propagate to the second optical fiber 1432 through the probe. The emission light may pass through the first beam splitter 1421. The reflected emission light may pass through the second filter 1425 and the second pinhole 1462 and propagate to the first photo multiplier tube 1471.

According to one embodiment, the beam of the third wavelength (e.g., a wavelength between 350 nm and 450 nm) emitted from the second laser 1412 may be reflected by the first beam splitter 1421, but the emission light passes through the first beam splitter 1421 because it has a relatively higher wavelength than the beam of the third wavelength. In other words, as the beam of the third wavelength is irradiated onto the object, the beam of the third wavelength may become excited, and the emission light may have a relatively higher wavelength than the beam of the third wavelength.

FIG. 19 is a diagram illustrating the movement of a second beam splitter within an optical path according to an embodiment.

Referring to FIG. 19, a second beam splitter 1422 may be positioned in the first portion 211 of the optical path 210 according to one embodiment. FIG. 19 shows a view of the cross-section of the first portion 211, viewed from the third portion 213 towards the first portion 211, based on the diagram of FIG. 15. A first rail 1921 may be formed at the upper edge of the first portion 211 of the optical path 210, and a second rail 1922 may be formed at the lower edge of the first portion 211. For example, the first rail 1921 and the second rail 1922 may be formed at the opposite ends of a slot into which the second beam splitter 1422 can be inserted, extending in a direction perpendicular to the longitudinal direction of the optical path 210. The opposite ends of the slot may correspond to the second groove 222.

According to one embodiment, at least one processor of the optical system 101 may position the second beam splitter within the first portion 211 of the optical path 210 or control the movement of the second beam splitter so that it moves to a space 1910 outside the optical path 210. For example, the at least one processor may control the first rail 1921 and the second rail 1922 to position the second beam splitter 1422 within the first portion 211 when the second beam splitter 1422 needs to be utilized, as in the embodiment of FIG. 17. In another example, the at least one processor may control the first rail 1921 and the second rail 1922 to move the second beam splitter 1422 to the space 1910 when it is not utilized, as in the embodiment of FIG. 18.

Consequently, the at least one processor may move the second beam splitter 1422 from a first position (e.g., within the first portion 211 of the optical path 210) to a second position (e.g., the space 1910) or move it from the second position to the first position based on specified conditions.

According to one embodiment, if the second beam splitter 1422 moves out of the first portion 211 of the optical path 210 and is positioned in the space 1910, the beams or emission light passing through the optical path 210 of the optical propagation module (e.g., optical propagation module 1820) may not pass through the second beam splitter 1422.

According to one embodiment, the optical system 101 may enhance the compatibility of the optical propagation module (e.g., optical propagation module 1420) by controlling the position of the second beam splitter 1422. For example, the optical propagation module 1420 shown in FIG. 15 may have beam splitters positioned in the first groove 221, second groove 222, and third groove 223, respectively. In one example, if predetermined conditions are met, at least one processor may move some of the beam splitters into the optical path 210 and others out of the optical path 210.

As a result, the optical propagation module 1420 may function both as an optical propagation module utilizing multiple wavelengths and as one utilizing a single wavelength.

According to one embodiment, the optical system 101 may further include a display, and at least one processor may display the status of the beam splitters positioned in the grooves of the optical propagation module 1420 on the display. For example, the at least one processor may indicate that the first beam splitter 121 in the first groove 221 is not positioned in the first portion 221 (e.g., "out" status). The at least one processor may indicate that the second beam splitter 122 in the second groove 222 is positioned in the first portion 221 (e.g., "in" status). Consequently, by displaying the status of the beam splitters positioned in the optical propagation module 1420, the at least one processor may notify the user whether the current optical propagation module 1420 is being utilized as a multi-wavelength module or a single-wavelength module. It is evident to a person skilled in the art that the description of displaying the status of optical components (e.g., beam splitters) on the display applies equally to filters (e.g., the first filter, second filter).

According to one embodiment, the at least one processor may transmit the status of the optical components displayed on the display to an external device (e.g., a user's terminal). For example, by transmitting the status of the optical components to an external device, the at least one processor may enable a user located remotely from the optical system 101 to identify the status of the optical components.

In FIG. 19 of the present disclosure, it is described that the beam splitters are fixed to the rails of the optical path 210, but this is merely an example. For instance, in the embodiments of FIGS. 1 through 18 of the present disclosure, the beam splitters may remain stationary, fixed to grooves (e.g., the first groove 221).

In FIG. 19 of the present disclosure, the description focuses on the second beam splitter 1422, but this is merely an example, and the content described in FIG. 19 may also be applied to other beam splitters. For example, the content described in FIG. 19 may be similarly applied to the first beam splitter 1421.

In FIG. 19 of the present disclosure, the description focuses on the second beam splitter 1422, but this is merely an example, and the content described in FIG. 19 may also be applied to filters. For example, the content described in FIG. 19 may be similarly applied to the first filter 1423, second filter 1425, and third filter 1525.

In the present disclosure, the movement of the second beam splitter 1422 is described as being performed by at least one processor within the optical propagation module 120 or the optical system 101, but this is merely an example. The second beam splitter 1422 may be moved based on user input for the optical propagation module 120 or the optical system 101.

An optical system mounted on a confocal endomicroscope according to an embodiment of the present disclosure, which simultaneously irradiates an object with a first beam of a first wavelength output by a first laser and a second beam of a second wavelength output by a second laser, acquires emission light emitted from the object, and processes the acquired emission light, may include the first laser coupled to a first optical fiber and the second laser coupled to a second optical fiber. The optical system may further include an optical fiber coupler that couples the first optical fiber and the second optical fiber into a third optical fiber such that the first beam propagating through the first optical fiber and the second beam propagating through the second optical fiber are simultaneously propagated through the third optical fiber, and an optical propagation module through which the first and second beams output from the optical fiber coupler are propagated. The optical propagation module may include an optical path through which the first beam, the second beam, and the emission light propagate, multiple optical components, a first collimator coupled to the third optical fiber, and a second collimator coupled to a fourth optical fiber, which is connected to a probe for irradiating the first and second beams onto the object.

According to one embodiment, the multiple optical components of the optical propagation module may include a first beam splitter that does not transmit a beam having a wavelength within a range between the first wavelength and a second wavelength larger than the first wavelength, and a second beam splitter that does not transmit a beam having a wavelength within a range greater than the second wavelength and up to a third wavelength.

According to one embodiment, a beam not transmitted by the first beam splitter may be reflected by the first beam splitter. A beam not transmitted by the second beam splitter may be reflected by the second beam splitter.

According to one embodiment, the multiple optical components of the optical propagation module may include a first filter that transmits only a beam having a wavelength within a range between a fourth wavelength and a fifth wavelength larger than the fourth wavelength, and a second filter that transmits a beam having a wavelength greater than or equal to a sixth wavelength, which is larger than the fifth wavelength.

According to one embodiment, in response to the first beam being irradiated onto the object, the first emission light emitted from the object may have a wavelength within the range between the fourth wavelength and the fifth wavelength. In response to the second beam being irradiated onto the object, the second emission light emitted from the object may have a wavelength within a range equal to or greater than the sixth wavelength.

According to one embodiment, the optical propagation module may further include a first photo multiplier tube and a second photo multiplier tube. The optical path of the optical propagation module may include a first portion connecting the first collimator and the second collimator, a second portion extending from the first portion and connected to the first photo multiplier tube, and a third portion extending from the first portion and connected to the second photo multiplier tube.

According to one embodiment, in response to the first beam being incident on the object, the first emission light emitted from the object may propagate to the first photo multiplier tube. In response to the second beam being incident on the object, the second emission light emitted from the object may propagate to the second photo multiplier tube.

According to one embodiment, the optical propagation module may include a connection portion capable of being coupled to a third collimator. The optical path of the optical propagation module may include a fourth portion connecting the first portion and the connection port.

According to one embodiment, the multiple optical components may include a first beam splitter and a second beam splitter. The first portion of the optical path may have a first groove formed to accommodate the first beam splitter, and a second groove may be formed to accommodate the second beam splitter.

According to one embodiment, the first rail may be positioned in the first groove, and the first beam splitter may be fixed on the first rail. When the first beam splitter is in the first position on the first rail, the first beam and the second beam may be incident on the first beam splitter. When the first beam splitter moves along the first rail from the first position by a specified distance, the first beam and the second beam may no longer be incident on the first beam splitter.

According to one embodiment, the position of the first beam splitter on the first rail may be controlled by at least one processor included in the optical propagation module or may be controlled based on user input.

According to one embodiment, the optical propagation module may include a first beam splitter, a first filter, a first lens for adjusting the focusing of the incident beam, a first pinhole (slit), and a first photo multiplier tube. The first filter may be positioned between the first beam splitter and the first photo multiplier tube. The first lens may be positioned between the first filter and the first photo multiplier tube. The first pinhole, through which the beam output from the first lens passes, may be positioned between the first lens and the first photo multiplier tube.

According to one embodiment, in response to the first beam being incident on the object, the first emission light emitted from the object may have a wavelength higher than the first wavelength of the first beam. In response to the second beam being incident on the object, the second emission light emitted from the object may have a wavelength higher than the second wavelength of the second beam.

According to one embodiment, the first wavelength of the first beam may be within a range of 450 nm to 500 nm, and the second wavelength of the second beam may be within a range of 750 nm to 800 nm.

An optical system mounted on a confocal endomicroscope according to an embodiment of the present disclosure, which irradiates an object with a first beam of a first wavelength and acquires emission light emitted from the object and processes the acquired emission light, may include a first laser coupled to a first optical fiber and an optical propagation module through which the first beam output from the first laser propagates. The optical propagation module may include an optical path through which the first beam and the emission light propagate to the object, multiple optical components, a first collimator coupled to the first optical fiber, and a second collimator coupled to a second optical fiber, which is connected to a probe for irradiating the first beam onto the object.

What is claimed is:

1. An optical system mounted on a confocal endomicroscope for outputting a first beam of a first wavelength via a first laser and a second beam of a second wavelength via a second laser, irradiating an object with the first and second beams simultaneously, acquiring emission light emitted from the object, and processing the acquired emission light, the optical system comprising:

the first laser coupled to a first optical fiber and the second laser coupled to a second optical fiber;

an optical fiber coupler configured to combine the first optical fiber and the second optical fiber into a third optical fiber such that the first beam propagating through the first optical fiber and the second beam propagating through the second optical fiber are propagated simultaneously through the third optical fiber; and an optical propagation module through which the first beam and the second beam output from the optical fiber coupler propagate, wherein the optical propagation module comprises:

an optical path through which the first beam, the second beam, and the emission light propagate;

a plurality of optical members;

a first collimator coupled to the third optical fiber; and a second collimator, coupled to a fourth optical fiber and connected to a probe for irradiating the object with the first and second beams, wherein the second collimator is configured to condense the first and second beams, corresponding to parallel light propagating along the optical path, to be transmitted through the fourth optical fiber, wherein no optical element other than the fourth optical fiber is disposed between the second collimator and the probe, wherein the first and second beams are configured to be transmitted through the fourth optical fiber to the probe, and wherein the plurality of optical members of the optical propagation module comprise:

a second beam splitter configured to not transmit beams with a second wavelength band defined as wavelengths less than or equal to a third wavelength, the third wavelength being greater than the second wavelength.

2. The optical system of claim 1, wherein the plurality of optical members of the optical propagation module further comprise:

a first beam splitter configured to not transmit beams with a first wavelength band defined as wavelengths between the first wavelength and the second wavelength, the second wavelength being greater than the first wavelength.

3. The optical system of claim 2, wherein the beams in the first wavelength band are configured to be reflected by the first beam splitter, and wherein the beams in the second wavelength band are configured to be reflected by the second beam splitter.

4. The optical system of claim 1, wherein the plurality of optical members of the optical propagation module comprise:

a first filter configured to transmit only beams with wavelengths corresponding to a wavelength band between a fourth wavelength and a fifth wavelength greater than the fourth wavelength; and a second filter configured to transmit beams with wavelengths corresponding to a wavelength band of at least a sixth wavelength greater than the fifth wavelength.

5. The optical system of claim 4, wherein a first emission light of the emission light emitted from the object in response to the irradiation of the object by the first beam has a wavelength corresponding to the wavelength band between the fourth wavelength and the fifth wavelength, and wherein a second emission light of the emission light emitted from the object in response to the irradiation of the object by the second beam has a wavelength corresponding to a wavelength band above the sixth wavelength.

6. The optical system of claim 1, wherein the optical propagation module further comprises a first photodetector (photo multiplier tube) and a second photodetector, and wherein the optical path of the optical propagation module comprises:

a first portion connecting the first collimator and the second collimator;

a second portion extending from the first portion and connected to the first photodetector; and a third portion extending from the first portion and connected to the second photodetector.

7. The optical system of claim 6, wherein a first emission light of the emission light emitted from the object in response to the irradiation of the object by the first beam is configured to be propagated to the first photodetector, and wherein a second emission light of the emission light emitted from the object in response to the irradiation of the object by the second beam is configured to be propagated to the second photodetector.

8. The optical system of claim 6, wherein the optical propagation module comprises a first connection portion configured to be coupled to the first collimator and a second connection portion configured to be coupled to a third collimator, and wherein the optical path of the optical propagation module includes a fourth portion configured to connect the first portion and the second connection portion.

9. The optical system of claim 6, wherein the plurality of optical members comprise a first beam splitter and a second beam splitter, and wherein the first portion of the optical path includes:

a first groove formed to accommodate the first beam splitter, and a second groove formed to accommodate the second beam splitter.

10. The optical system of claim 9, wherein a first rail is disposed within the second groove, wherein in response to the second beam splitter being at a first position on the first rail, the first beam and the second beam are configured to be incident on the first beam splitter, and wherein in response to the second beam splitter moving a specified distance along the first rail from the first position, the first beam and the second beam are configured to be not incident on the first beam splitter.

11. The optical system of claim 10, wherein the first position of the second beam splitter on the first rail is configured to be controlled by at least one processor included in the optical propagation module or is configured to be controlled based on user input.

12. The optical system of claim 1, wherein the optical propagation module comprises a first beam splitter, a first filter, a first lens configured to adjust the focus of the incident beam, a first pinhole, and a first photo multiplier tube, wherein the first filter is disposed between the first beam splitter and the first photo multiplier tube, wherein the first lens is disposed between the first filter and the first photo multiplier tube, and wherein the first pinhole, through which the beam output from the first lens passes, is disposed between the first lens and the first photo multiplier tube.

13. The optical system of claim 1, wherein a first emission light of the emission light emitted from the object in response to the irradiation of the object by the first beam has a wavelength higher than the first wavelength of the first beam, and wherein a second emission light of the emission light emitted from the object in response to the irradiation of the object by the second beam has a wavelength higher than the second wavelength of the second beam.

14. The optical system of claim 1, wherein the first wavelength of the first beam corresponds to a wavelength between 450 nm and 500 nm, and wherein the second wavelength of the second beam corresponds to a wavelength between 750 nm and 800 nm.

15. An optical system mounted on a confocal endomicroscope for irradiating an object with a first beam of a first wavelength, acquiring emission light emitted from the object, and processing the acquired emission light, the optical system comprising:

a first laser coupled to a first optical fiber; and an optical propagation module through which the first beam output from the first laser propagates, wherein the optical propagation module comprises:

an optical path through which the first beam and the emission light propagate;

a plurality of optical members;

a first collimator coupled to the first optical fiber; and a second collimator, coupled to a second optical fiber and connected to a probe for irradiating the object with the first beam, wherein the second collimator is configured to condense the first beam, corresponding to parallel light propagating along the optical path, to be transmitted through the second optical fiber, wherein no optical element other than the second optical fiber is disposed between the second collimator and the probe, wherein the first beam transmitted through the second collimator is configured to be propagated to the probe via the second optical fiber, and wherein the plurality of optical members of the optical propagation module comprise:

a second beam splitter configured to not transmit beams with a second wavelength band defined as wavelengths less than or equal to a third wavelength, the third wavelength being greater than a second wavelength.

* * * * *